US011938855B1

(12) United States Patent
Muralidharan

(10) Patent No.: US 11,938,855 B1
(45) Date of Patent: Mar. 26, 2024

(54) ADAPTIVE VEHICLE SEAT BACK STIFFNESS RESTRAINT SYSTEM

(71) Applicant: Zoox, Inc., Foster City, CA (US)

(72) Inventor: Nirmal Muralidharan, San Mateo, CA (US)

(73) Assignee: Zoox, Inc., Foster City, CA (US)

(*) Notice: Subject to any disclaimer, the term of this patent is extended or adjusted under 35 U.S.C. 154(b) by 47 days.

(21) Appl. No.: 17/820,938

(22) Filed: Aug. 19, 2022

(51) Int. Cl.
*B60N 2/02* (2006.01)
*B60N 2/42* (2006.01)
*B60N 2/90* (2018.01)

(52) U.S. Cl.
CPC .......... *B60N 2/914* (2018.02); *B60N 2/0276* (2013.01); *B60N 2/4249* (2013.01); *B60N 2/0268* (2023.08)

(58) Field of Classification Search
CPC ..... B60N 2/914; B60N 2/0276; B60N 2/4249
See application file for complete search history.

(56) References Cited

U.S. PATENT DOCUMENTS

| | | | | |
|---|---|---|---|---|
| 10,363,852 B2 * | 7/2019 | Strumolo | ............... | B60N 2/806 |
| 2003/0149517 A1 * | 8/2003 | Murphy | ............ | B60R 21/01522 |
| | | | | 701/45 |
| 2012/0025966 A1 * | 2/2012 | Nakanishi | ........... | B60R 21/0152 |
| | | | | 340/436 |
| 2018/0072199 A1 * | 3/2018 | Strumolo | ................ | B60N 2/99 |
| 2018/0126876 A1 * | 5/2018 | Takamatsu | ............... | B60N 2/16 |
| 2018/0156629 A1 * | 6/2018 | Lem | .................... | G01C 21/3652 |
| 2018/0304774 A1 * | 10/2018 | Mizoi | .................... | B60N 2/002 |
| 2018/0361897 A1 * | 12/2018 | Lem | ....................... | B60N 2/976 |
| 2020/0216006 A1 * | 7/2020 | Jaradi | .................... | B60N 2/143 |
| 2021/0122270 A1 * | 4/2021 | Baer | ....................... | B60N 2/01 |
| 2023/0038920 A1 * | 2/2023 | Mizoi | .................... | G01B 11/26 |

* cited by examiner

*Primary Examiner* — Phutthiwat Wongwian
*Assistant Examiner* — Arnold Castro
(74) *Attorney, Agent, or Firm* — Lee & Hayes, P.C.

(57) ABSTRACT

A seat for a vehicle may include a seatback including a variable resistance support disposed within a volume of the seatback. The variable resistance support may further include one or more configurable arrays of resistive elements including collapsible structures and/or inflatable bladders that may be configured to provide energy dissipation and/or absorption during a collision event. One or more array subsets may be configured to be independently controllable and configured to provide adjustable support at a region of the seatback, the adjustable support corresponding to a mass of the occupant. Moreover, when at least a portion of the back of an occupant pushes against a front surface of the seatback due to the collision event, the arrays of resistive elements may be configured to compress and/or collapse, at least partially, to absorb an energy applied from an occupant's back associated with the collision event.

20 Claims, 9 Drawing Sheets

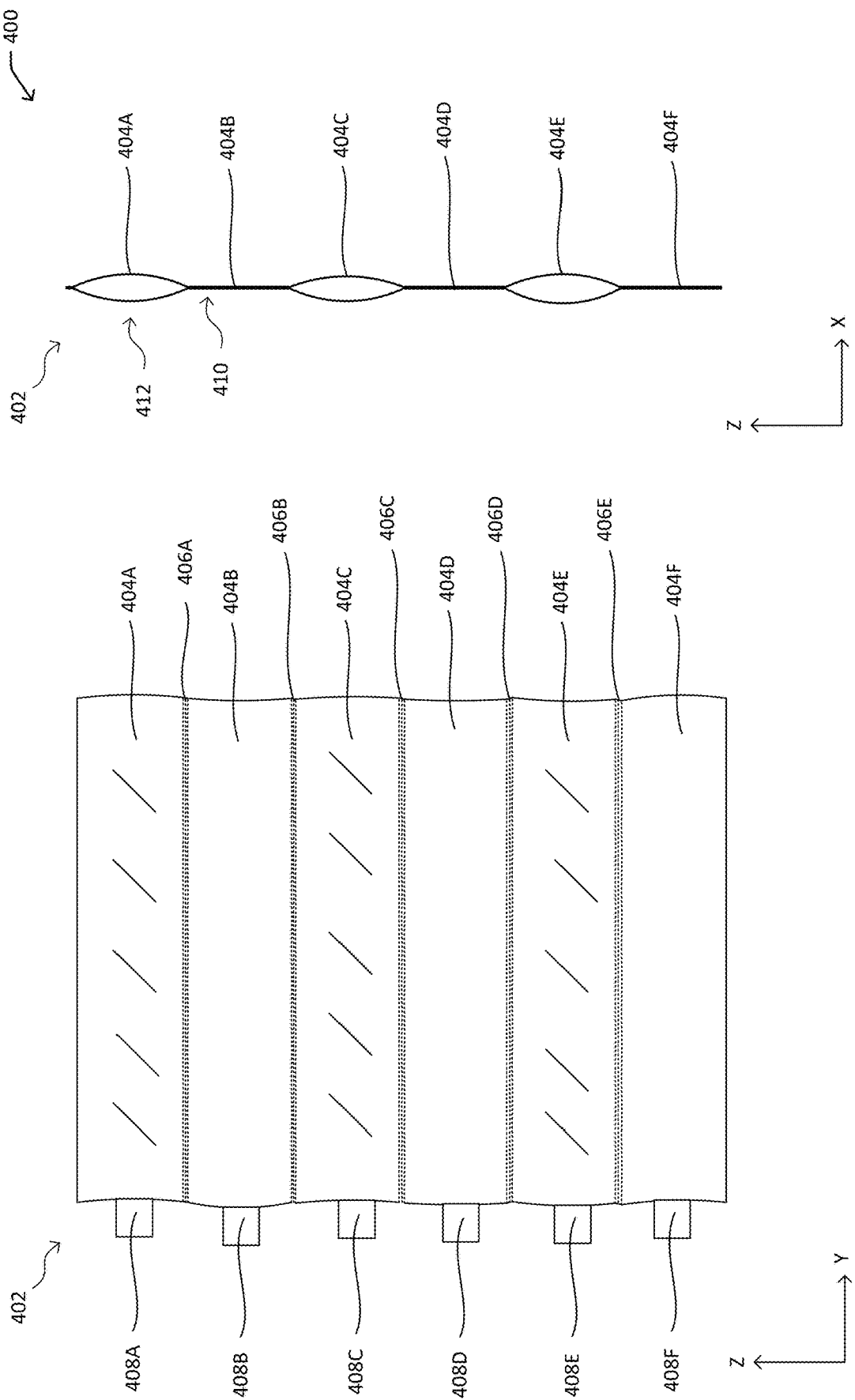

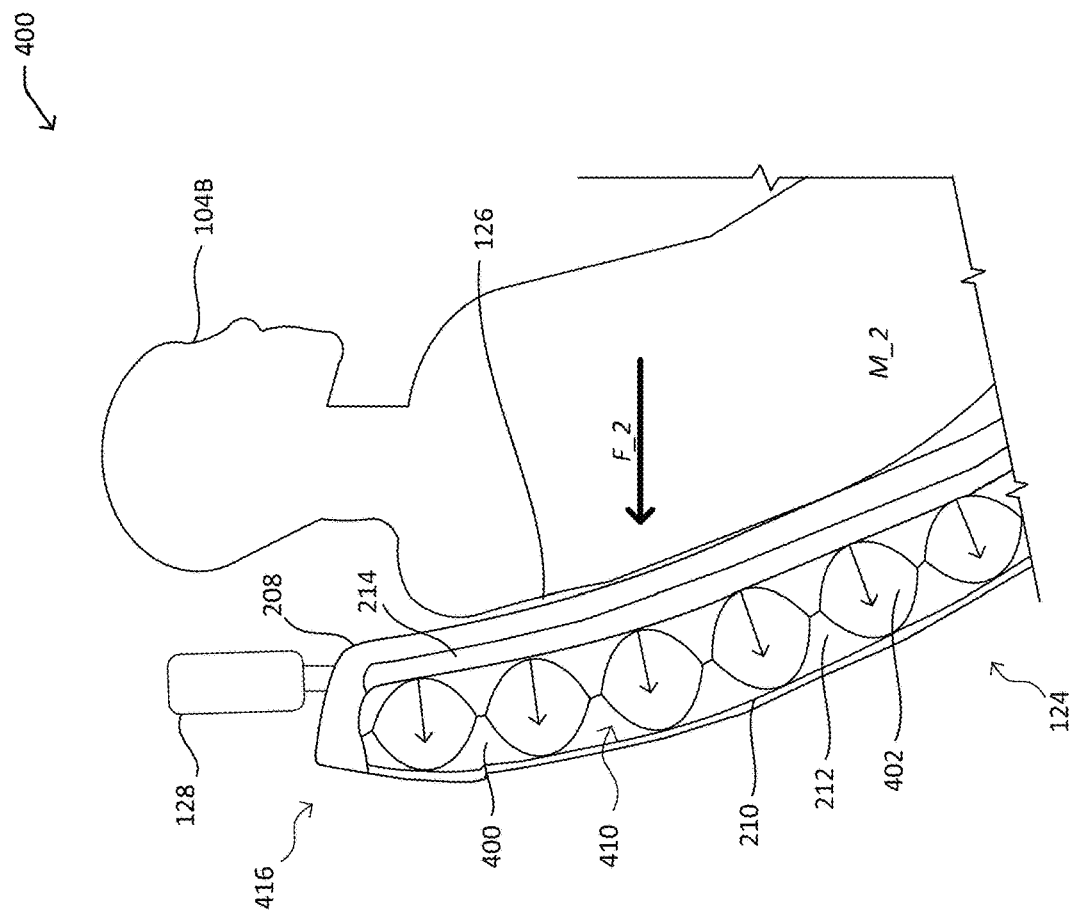
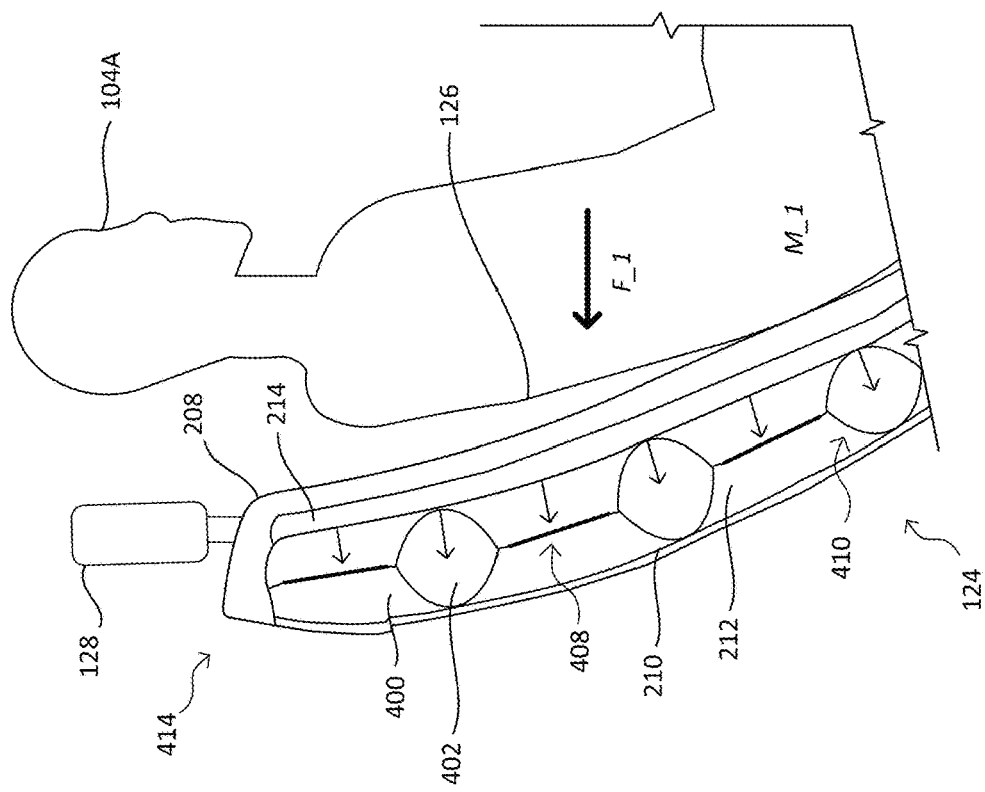
FIG. 4C
FIG. 4D

ADAPTIVE VEHICLE SEAT BACK STIFFNESS RESTRAINT SYSTEM

BACKGROUND

During a vehicle collision, injuries to an occupant of the vehicle may result from the occupant contacting a surface inside the vehicle. As the difference between the speed of the occupant and the speed of the surface the occupant contacts increases, the force to which the occupant is subjected also increases, thereby increasing the likelihood or severity of injury to the occupant during the collision. Conventional seatbelts and airbags attempt to reduce the effects of collisions by preventing or reducing the likelihood of the occupant contacting an interior surface and/or reducing the difference between the speed of the occupant and the speed of any surface the occupant contacts. However, conventional seatbelts and airbags may not provide sufficient protection to an occupant under certain collision conditions.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

FIGS. 4A-4D are schematic views of examples of seatbacks and variable resistance control systems as described herein.

DETAILED DESCRIPTION

Figure 1:
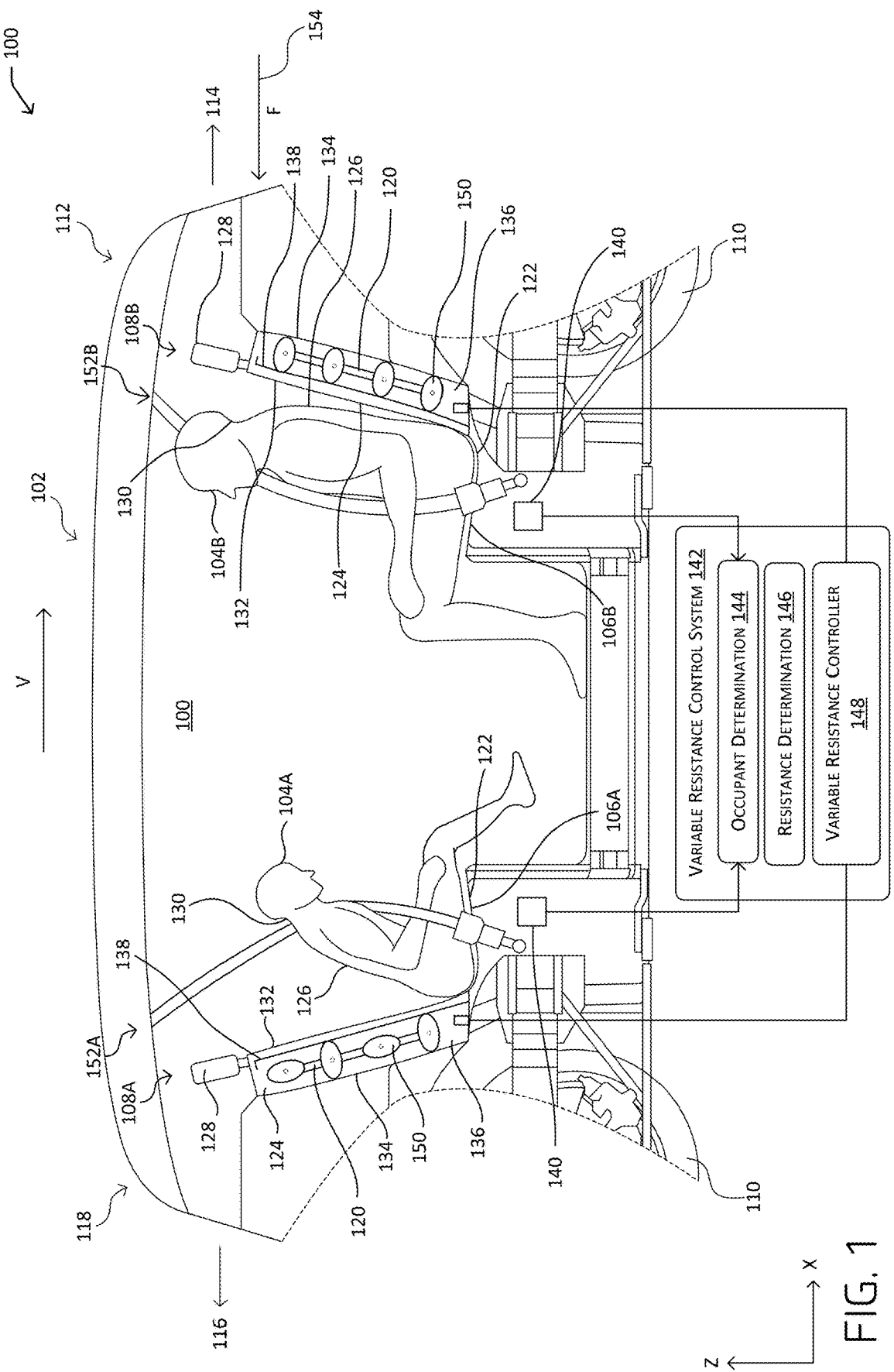
FIG. 1 is a cutaway side view of an example vehicle including an example variable resistance control system during a change in velocity consistent with a collision.

As mentioned above, safety components of a vehicle may not always provide sufficient protection to an occupant during certain collisions. Also, conventional safety components are often designed using a one size fits all approach, and thus may not accommodate characteristic and/or physical characteristic differences between occupants. With respect to safety, during a vehicle collision, injuries to an occupant of the vehicle may result from the occupant contacting a surface inside the vehicle during the collision. As a difference between the speed of the occupant and the speed of the surface the occupant contacts increase, the force to which the occupant is subjected also increases, thereby increasing the likelihood or severity of injuries to the occupant during the collision. Additionally, accounting for characteristic differences between occupants, occupants having greater masses may require greater energy dissipation than occupants having lesser masses, relative to the surface the occupant contacts. While conventional safety components such as seatbelt and airbags can provide some degree of protection to a rider, their effectiveness is limited to certain collision scenarios (e.g., front facing collisions). Also, while other conventional safety components such as compressive seatback padding can provide some degree of protection to a rider, they do not accommodate characteristic differences between riders which contribute to the likelihood or severity of injuries to the occupant during the collision.

This application relates to configurable seatbacks, and more particular to seatbacks for a vehicle that can be configured to provide variable resistance based on attributes of an occupant of the seat. This application also relates to systems and techniques for controlling such seatback. In examples, the seatbacks described herein may be suited to assist with protecting a rear-facing occupant during a collision or rapid deceleration of the vehicle.

Occupants are generally unique from one another. For example, occupants may possess numerous differences in characteristics including mass, weight, height, sitting orientation and/or position, and the like. These differing characteristics may account for differences experienced by various occupants during collisions. For example, occupants with greater masses may experience great magnitudes of forces during a collision as their masses combine with an acceleration resulting from the collision. Accordingly, or alternatively, occupants with lesser masses may experience lesser magnitudes of forces during a collision where the acceleration resulting from the collision remains constant. It is therefore useful to have an adaptable seatback that may account for one or more characteristics of the occupants for their safety. For example, the seatback may provide reactionary forces opposing any forces generated by individual of the occupants. The adaptable seatback may be configured to alter any reactionary forces based at least in part on one or more characteristics of the occupant. Further, the adaptable seatback may be configurable to provide variable reactionary forces, capable of dissipating forces from the occupant, within a fixed and/or semi-fixed volume. Semi-fixed may relate to a volume that is fixed under normal conditions, but which may experience some variance under forces in excess of a threshold value. A seatback having a variable resistance component within a substantially fixed volume across multiple resistive states can aid in packaging, comfort, and or design of the seats. Because of the substantially fixed volume, a surface of the seat facing a user may not protrude outwards toward the user or retract inwards when resistivity of the variable resistive component is altered.

A variable resistance control system, as described and alluded to herein, may include an adaptable seatback. The adaptable seatback may further include a variable resistance support. The variable resistance support may adjust a stiffness, compressive ability, and/or the like based at least in part on one or more characteristics of the occupant in a seat equipped with the adaptive seatback and/or variable resistance support. For example, the variable resistance support may adjust its stiffness relative and/or commensurate with a mass of the occupant.

The variable resistance support may adjust its stiffness using one or more resistance elements. A first type of resistive element may include mechanical and/or configurable elements. For example, the resistive elements may be made of a compressive material. In examples, the resistive elements may be configured to crush and/or compress under a threshold value of force. In examples, the resistive elements may be actuatable between one or more states of resistance and/or stiffness. For example, the resistive elements may actuate between an inactive (e.g., non-resistive) state and an active (e.g., resistive) state. The resistive elements may actuate between the one or more states though rotation, linear adjustment, and/or the like. The resistive elements may further be made of a deformable material. In examples, the resistive elements may be any shape including triangular, cylindrical, pyramids, etc. In some examples, the resistive elements may resist forces with their individual densities being a factor. In examples, the resistive elements may be made of a high-density material such as polyurethane foam (e.g., a high-stiffness and/or high-density polyurethane foam or one or more materials having similar characteristics (e.g., having a similar stiffness characteristics)).

Additionally, or alternatively, the resistance support may adjust its stiffness using a bladder structure. In some examples, the bladder structure may be further divided into one or more inflatable bladders. The one or more inflatable bladders may be configured to compress and/or otherwise absorb any forces experienced by the seatback. In examples, the inflatable bladders may inflate between an inactive (e.g., deflated) state and an active (e.g., inflated) stated. The one or more inflatable bladders may inflate between the one or more states via one or more expansion devices. In examples, the one or more expansion devices may connect two or more of the inflatable bladders. In further examples, the one or more inflatable bladders may be filled with any medium as appreciated by one skilled in the art and in light of this disclosure.

While the variable resistance support is described as having one or more resistive elements and/or one or more inflatable bladders, other configurations are contemplated. For examples, the variable resistance support may use actuatable springs to adjust stiffness. In examples, springs of one or more resistances and/or stiffnesses may be configured to adjust the stiffness of the variable resistance support. In other examples, the variable resistance support may adjust stiffness using pneumatic devices, struts, and/or the like.

In some examples, a cushion and/or comfort layer may be placed between the variable resistance support and a back of the occupant. For example, the cushion can be material and/or include the use of comfort foams. The cushion may be used to improve comfort for the occupant. In examples, the cushion may provide additional compression and/or absorption properties. In further examples, the cushion may work in conjunction with the variable resistance support to compress and/or absorb any forces experienced by the seatback.

In examples, the seatback may also include a rigid element. The rigid element may be placed between the variable resistance support and the back of the occupant. In examples, the rigid element may be placed between the cushion and the variable resistance support. The rigid element may be made of a material resistant to deformation. For example, the rigid element may be made a of a thin metal sheet, polymeric sheet, glass, etc. In examples, the rigid element may distribute any forces applied to the seatback to the variable resistance support. In further examples, the rigid element may evenly distribute any forces to the resistive elements. In examples, the rigid element may provide additional safety to the occupant. For example, the rigid element may evenly distribute any reactionary forces from the variable resistance support and/or the resistive elements to the back of the occupant.

In examples, the variable resistance control system may be communicatively coupled to a controller. In examples, the controller may receive data, associated with the occupant, via one or more sensors. In response to receiving data on the occupant, the controller may cause the variable resistance support to configure its stiffness and/or resistance. For example, the controller may cause one or more of the resistive elements and/or the inflatable bladders to configure between one or more states. In such instances, the controller may configure the variable resistance support based at least in part on the sensor data.

In examples, one or more of the resistive elements and/or the inflatable bladders may be configured upon seating of the passenger. Alternatively, one or more of the resistive elements and/or the inflatable bladders may be configured in response to a collision event. In such instances, the variable resistance support may configured based at least in part on the sensor data, a user profile, sensor feedback, a planning system, a safety system, and/or the like.

In some instances, the deployment parameters may be determined using known characteristic(s) of the occupant and/or a profile (e.g., account) of the occupant, such as height, weight, head size, etc. For example, a vehicle used for mass transportation may communicate with a mobile device of a user or otherwise identify and store a per-user profile including information pertaining to the safe deployment of the seat actuator. In certain instances, the deployment parameters may change depending on the seat orientation, seat configuration, characteristics of the occupant (e.g., weight, height, etc.) and/or may be uniquely associated with a specific seating position within a vehicle. For example, deployment parameters may be different between a rearward-facing occupant, a side-facing occupant, and/or a forward-facing occupant within a vehicle.

In some instances, the vehicle may include the planning system, the safety system, or both that can determine change in velocity of the vehicle, a predicted change in velocity of the vehicle, a collision, or a predicted collision probability in view of one or more objects based on sensor data received by one or more sensors and communicate with the controller and/or the variable resistance control system. The sensor data may include data associated with the vehicle and/or one or more objects in the environment of the vehicle. For example, the sensor data may include information associated with physical characteristics, a location, and/or a movement associated with the vehicle and the object(s). Additional information associated with the object(s) may be determined based on the sensor data, such as a position, a velocity, an acceleration, a direction, a size, a shape, a type of the object, etc. Based on the sensor data, trajectories of the vehicle and/or the object may be determined for use in determining the collision probability. Generally, the probability may represent a likelihood, or risk, of the change in velocity of the vehicle, a predicted change in velocity of the vehicle, a collision, or a predicted collision occurring. In most circumstances, the vehicle can maneuver to safely avoid the collision. However, in instances where avoidance is impossible and the probability of a change in velocity of the vehicle, a predicted change in velocity of the vehicle, a collision, or a predicted collision is greater than a threshold probability, the planning system and/or safety system may determine that a change in velocity of the vehicle or a collision is predicted to occur. In some instances, whether the change in velocity or the collision is predicted to occur may be based at least in part on determining that the change in velocity or collision is imminent (e.g., within a certain amount of time). Based on this determination, the planning system and/or safety system may communicate with other system(s) of the vehicle such as one or more variable resistance control systems to protect the occupant. In some instances, engagement of one or more variable resistance control systems may be performed prior to (e.g., at a threshold time before) a change in velocity or a collision (e.g., pre-collision), during a change in velocity, during a collision, and/or after a change in velocity or collision (e.g., post-collision). In instances where the variable resistance control system is engaged prior to the change in velocity or collision, the safety system and/or the planning system may communicate with systems of the vehicle in advance and with enough time to permit engagement of the variable resistance support or other safety device.

This disclosure is generally directed to apparatuses, systems, and methods for reducing the likelihood and/or severity of injury to an occupant during an event or collision event. In at least some examples, techniques provided herein, may mitigate injuries/damages in collisions.

The variable resistance control system as described can be implemented in any vehicle seat. In examples, the variable resistance control system may be the only safety system provided in a seat of a vehicle. In examples, the variable resistance control system as described herein may be employed with one or more other safety systems. In examples, the variable resistance control system as described can be implemented in a seat who can also include one or more of an active headrest. In examples, the variable resistance control system as described may be employed together with a protection system and/or any other safety system as may be appreciated by one skilled in the art in light of this disclosure.

In some instances, prior to the change in velocity of the vehicle, a predicted change in velocity of the vehicle, a collision, or a predicted collision occurring and/or upon first entering the vehicle, one or more vehicle system(s) may determine a safe position of the occupant. For example, upon entering the vehicle, the occupant may be instructed to sit in the seat in an upright or seated position. In some instances, a display within the vehicle may illustrate or present content associated with a proper seating position or a proper position of the occupant. Camera(s), weight sensors, distance sensors, or other sensors within the vehicle, for example, may determine whether the occupant is positioned correctly relative to the seatback, and may also determine the one or more characteristics of the occupant.

The techniques and systems described herein may be implemented in a number of ways. Example implementations are provided below with reference to the figures.

FIG. 1 is a side cutaway view showing an interior 100 of an example vehicle 102. The example vehicle 102 may be configured to travel via a road network from one geographic location to a destination. For example, the interior 100 may include a plurality of seats 106 (e.g., seats 106A and 106B), which may be provided in any relative arrangement. In examples, the seats 106 may be configured to accommodate one or more occupants 104 (e.g., a first occupant 104A and a second occupant 104B). The example vehicle 102 shown in FIG. 1 includes a carriage-style seating arrangement in a substantially central portion of the interior 100 of vehicle 102. For example, the vehicle 102 may include one or more rows 108 (e.g., rows 108A and 108B) of seats 106, and in some examples, two of the rows 108 of seats 106 may face each other, for example, as shown in FIG. 1. One or more of the rows 108 of seats 106 may include two seats 106. In some examples, one or more of the two seats 106 may be a bench-style seat configured to provide seating for one or more occupants 104. Other relative arrangements and numbers of seats 106 are contemplated.

The vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially- or fully-autonomously controlled.

The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more internal combustion engines, one or more electric motors, hydrogen power, any combination thereof, and/or any other suitable power sources. Although the example vehicle 102 has four wheels 110, the systems and methods described herein may be incorporated into vehicles having fewer or a greater number of wheels, tires, and/or tracks. The example vehicle 102 may have four-wheel steering and may be multi-directional, configured to operate generally with equal performance characteristics in all directions. For example, the vehicle may be bidirectional such that a first end 112 of the vehicle 102 is the leading end of the vehicle 102 when travelling in a first direction 114, and such that the first end 112 becomes the trailing end of the vehicle 102 when traveling in the opposite, second direction 116, as shown in FIG. 1. Similarly, a second end 118 of the vehicle 102 is the leading end of the vehicle 102 when travelling in the second direction 116, and such that the second end 118 becomes the trailing end of the vehicle 102 when traveling in the opposite, first direction 114. These example characteristics may facilitate greater maneuverability, for example, in small spaces or crowded environments, such as parking lots and urban areas.

As shown in FIG. 1, a pair of occupants 104 (e.g., a smaller occupant 104A and a larger occupant 104B) are sitting in the seats 106. Due to the carriage-style arrangement of the seats, regardless of the direction of travel, one of the occupants 104 is front-facing and the other of the occupants 104 is rear-facing. As detailed herein, the vehicle 102 may include a variable resistance support 120 configured to provide variable stiffness and to protect one or more of the occupants 104 during a collision involving the vehicle 102. In some examples, the variable resistance support 120 may include, or be incorporated into, one or more portions of one or more of the seats 106 (e.g., a seatback).

As shown in FIG. 1, each of the example seats 106 includes a seat base 122, a seatback 124, and a headrest 128. In examples, the seat base 122 is configured to support at least a portion of a weight of an occupant 104. The seatback 124 is associated with the seat base 122 (e.g., coupled to and/or adjacent to the seat base 122) and is configured to provide support to a back 126 of the occupant 104 of the seat 106. The headrest 128 is associated with the seatback 124 (e.g., coupled to and/or adjacent to the seatback 124) and configured to provide support to a head and/or neck 130 of the occupant 104 of the seat 106. In examples, the variable resistance support 120 may be incorporated in and/or disposed within seatback 124.

The seatback 124 includes a front portion 132 and a rear portion 134. The front portion 132 and the rear portion 134 may be spaced a distance apart. As also illustrated in FIG. 1, a volume 136 is disposed between the front portion 132 and the rear portion 134. In some examples, the front portion 132 and/or the rear portion 134 may define at least a portion of the volume 136. For example, the front portion 132 and the rear portion 134 may be spaced a distance (e.g., along the X-axis) and at least partially define the volume 136. The volume 136 may be further defined by sides of the seatback 124. For example, sides of the seatback 124 may be spaced a distance and at least partially define the volume 136 in a lateral direction (e.g., perpendicular to the X-axis). In examples, the volume 136 may be further defined by a top surface and a bottom surface of the seatback 124. For example, the top surface and the bottom surface may be spaced a distance (e.g., along the Z-axis) and at least partially define the volume 136. In examples, the volume 136 may be fixed. In other examples, the volume 136 may be substantially fixed. For example, the volume 136 fixed and/or substantially fixed because the front portion 132 and the rear portion 134 may be fixed relative to each other. In examples, the variable resistance support 120 may be disposed within the volume 136. As also shown in FIG. 1, a rigid element 138 may also be disposed within the volume, e.g., between the front portion 132 and the variable resistance support 120.

The front portion 132 may provide a surface to contact the back 126 of the occupant 104. The front portion 132 may be made of a rigid or partially rigid material. In examples, the front portion 132 may include one or more layers of comfort and/or compressive materials. For example, the front portion 132 may include a partially rigid material covered in one or more layers of foam and/or cloth. The foam and/or cloth covering on the front portion 132 may provide enhanced comfort to the occupant 104. In examples, the foam and/or cloth may provide the seatback 124 with some compressive properties. In such examples, the front portion 132 may work in conjunction with the variable resistance support 120 to absorb any forces exerted on the front portion 132 by the back 126 of the occupant 104.

The rear portion 134 may form a back surface opposing the front portion 134. The rear portion 134 may further be made of a rigid or partially rigid material. The rear portion 134 may be an individual piece of the seatback 124, separate from the vehicle 102. In examples, the rear portion 134 may be a portion of the vehicle 102. For example, the rear portion 134 may be an inner wall and/or surface of the vehicle 102. In further examples, the rear portion 134 may be a molded portion within the vehicle 102. The rear portion 134 may be configured to support the variable resistance support 120. For examples, the variable resistance support 120 may be mounted, other otherwise attached, to the rear portion 134. In examples, the rear portion 134 may be made of a material configured to resist deformation under applied forces. For example, the rear portion 134 may support the variable resistance support 120. In further examples, the rear portion 134 may provide a barrier for the variable resistance support 120 to compress and/or absorb any applied forces.

As described herein, the front portion 132 and the rear portion 134 may at least partially define the volume 136. The volume 136 may have disposed within it the variable resistance support 120. In examples, the variable resistance support 120 may fully occupy the volume 136. In other examples, the variable resistance support 120 may at least partially occupy the volume 136.

The volume may be fixed under normal conditions, e.g., under forces below a threshold value. For example, the occupant 104 may occasionally exert forces upon the front portion 132 during nominal acceleration and/or deceleration of the vehicle 102. The threshold value may represent forces experience during a collision event which may be determined using one or more characteristics, e.g., physical characteristics, of the occupant 104, a predetermined threshold value of forces, and/or the like. The volume 136 may further be compressible when experiencing forces greater than the threshold value. For example, the occupant 104 may exert forces, greater than the threshold value, which may compress the front portion 132 into the volume 136 which may otherwise be fixed. In such instances, the volume 136 may compress such that the front portion 132 contacts the variable resistance support 120 and any forces exerted on the front portion 132 is transferred onto the variable resistance support 120.

Additionally, as depicted in FIG. 1, the rigid element 138 may also be disposed within the volume 136. In examples, the rigid element 138 may be disposed within the volume 136 between the front portion 132 and the variable resistance support 120. In examples, the rigid element 138 may be fixed relative to the rear portion 134. In such instances, the rigid element 138 and the rear portion 134 may at least partially define a fixed and/or substantially fixed volume. The rigid element 138 may be configured to resist deformation and/or evenly distribute any forces experienced between the back 126 of the occupant 104, the first portion 132 of the seatback 124, and/or the variable resistance support 120. In examples, the rigid element 214 may include one or more materials resistant to deformation including aluminum, plastics, glasses, steel, etc. One or more materials resistant to deformation may provide a barrier between the front portion 132 and the variable resistance support 120. In examples, the rigid element 138 may evenly transfer any forces exerted on the rigid element 138, via the back 126 of the occupant 104 contacting the front portion 132, onto the variable resistance support 120. Similarly, the rigid element 138 may provide an even reactionary force from the variable resistance support to the back 126 of the occupant 104. In other words, the rigid element 138 may be configured to at least partially equalize reaction forces communicated across an area corresponding to at least a portion of the back 126 of the occupant 104. In some other examples, the rigid element 138 and the rear portion 134 may define the volume 136.

In examples, one or more sensors 140 may be provided in one or more portion of one or more of seats 106 (e.g., seat base, seatback, or headrest) configured to generate one or more signals indicative of the presence and/or absence of an occupant 104 on seat 106. In further examples, the one or more sensors 140 may be configured to generate one or more signals indicative of characteristics, e.g., physical characteristics of the occupant 104 including mass, weight, height, weight distribution, etc.

In examples, the one or more sensors 140 may be communicatively coupled to a variable resistance control system 142. Generally, the sensors 140 may generate sensor data used by the variable resistance control system 142 to determine whether to adjust stiffness of the variable resistance support 120. For example, the sensor(s) 140 can include sensors configured to detect characteristics of the occupant 104 and/or conditions associated with the vehicle. For example, the sensor(s) 140 can include radar sensors, lidar sensors, weight sensors, imaging sensors, occupant detection sensors, cargo detection sensors, and/or one or more other sensors. The variable resistance control system 142 may further include an occupant determination component 144.

In examples, the occupant determination component 144 may make determinations from sensor data received from the sensors 140. For example, the occupant determination component 144 may determine a presence of the occupant 104. Further, the occupant determination component 144 may determine a mass and/or weight of the occupant 104. Determinations made by the occupant determination component 144 may be communicatively coupled to a resistance determination component 146.

In examples, the resistance determination component 146 may determine a resistance and/or stiffness associated with information and/or data communicated from the occupant determination component 144. For example, the occupant determination component 144 may determine that the first occupant 104A has a weight of 70 kilograms. Additionally, the occupant determination component 144 may determine that the second occupant 104B has a weight of 110 kilograms. The resistance determination component 146 may use the weights and/or additional characteristics of the occupants 104A and 104B and determine an associated stiffness. For example, the resistance determination component 146 may determine a first resistance for the first occupant 104A and a second resistance for the second occupant 104B, the second resistance being greater than the first resistance.

In further examples, the resistance determination component 146 may determine a resistance configuration based at least in part on information from the occupant determination component 144. For example, the occupant determination component 144 may determine that the first occupant 104A has a height of 160 centimeters. Additionally, the occupant determination component 144 may determine that the second occupant 104B has a height of 190 centimeters. The resistance determination component 146 may use the heights and/or additional characteristics of the occupants 104 and determine an associated stiffness configuration. For example, the resistance determination component 146 may determine a configuration for the array of resistive elements corresponding to the heights and/or additional characteristics of the occupants 104. The resistance determination component 146 may determine a configuration for the array of resistive elements which may evenly distribute any forces exerted by the backs 126 of the occupants 104A and 104B, closely group subsets of the array of resistive elements to increase resistance at particular locations, and/or the like.

In examples, the resistance determination component 146 may store and/or access look up tables and/or the like that correlate mass, weight, height, and/or other thresholds (e.g., one or more characteristics of the occupant 104) to predetermined configurations of the variable resistance support 120. In examples, the variable resistance support 120 may have two configurations with a single threshold. For example, the resistance determination component 146 may determine a value less than the threshold value and cause the variable resistance support 120 to be configured to a first configuration. Accordingly, the resistance determination component 146 may determine a value greater or equal to the threshold value and cause the variable resistance support 120 to be configured to a second configuration. In further examples, there may be any number of configurations corresponding to any number of threshold values. For example, the resistance determination component 146 may determine any number of values and may, accordingly, cause the variable resistance support 120 to adjust to any number of corresponding and/or associated configurations.

In examples, a variable resistance controller 148 may be communicatively coupled to the variable resistance control system 142. The variable resistance controller 148 may, based at least in part on determinations made by the occupant determination component 144 and/or the resistance determination component 146, adjust stiffness of the variable resistance support 120. For example, in a scenario where the first occupant 104A weighs less than the second occupant 104B, the variable resistance controller 148 may adjust one or more resistive elements 150 associated with the variable resistance support 120 in the seat 106A to a first configuration and adjust one or more of the resistive elements 150 in the seat 106B to a second configuration. As illustrated in FIG. 1, the first orientation may include an alternating configuration for the resistive elements 150, configuring the seatback associated with the first occupant 104A to have a relatively lower less stiffness. The second orientation may include a fully activated configuration of the resistive elements 150, configuring the seatback associated with the second occupant 104B with a relatively greater stiffness.

In examples, the resistive elements 150 may maintain, or substantially maintain, the volume 136. For example, the resistive elements 150 may resist excess forces between the front portion 132 and/or the rigid element 138 and the occupant in the seat. Such forces, if not resisted, could cause the front portion 132 and/or the rigid element 138 to move toward the rear portion 134, thereby reducing the volume 136. In aspects of this disclosure, some or all of the resistive elements 150 may be actuated, based at least in part on a mass of the occupant 104, to provide the desired resistive forces, thereby maintaining the volume 136 substantially unchanged. By allowing for a variable resistance, as detailed herein, aspects of this disclosure can tailor the resistive forces to the forces expected to be imparted on the occupant during a collision. For example, lower forces will result from a smaller (lower mass) occupant than those from a larger (higher mass) occupant. By adjusting the resistive elements, each occupant can be adequately supported during a collision, based on their physical characteristics. While the resistive elements will resist or prevent deformation of portions of the seat, e.g., which deformation will result in decreasing the volume 136, the resistive elements may also ensure that a seatback is not too stiff. For example, a higher stiffness suitable for a larger occupant may be unsafe for a smaller occupant, because the higher stiffness may provide too much resistance to forces imparted on the seatback by the smaller occupant during a collision. In examples, the resistive elements provide a stiffness, per occupant, best suited to protect that occupant during a collision event.

For purposes of this disclosure, the resistive elements 150 may be a material configured to crush or deform, e.g., plastically deform, under a threshold load. For example, the recitative elements may be configured to deform under a pressure in the range of about 20 kPa to about 500 kPa. In examples, the resistive elements 150 may deform under a pressure of from about 280 kPa to about 350 kPa. Non limiting examples of the resistive elements 150 include polymeric foam (e.g., Impaxx 500, expanded polypropylene (EPP) foam, urethane foam, polystyrene foam, etc.), plastic, aluminum, cellulose based material, or a combination of these and/or other materials. In examples, the resistive elements 150 may be a substantially rigid foam configured to crush in plastic deformation under a threshold load. In examples, a portion or all of the resistive elements may be formed of a closed cell, thermoplastic foam having a density of at most 40 grams per liter, and a compression strength of at least about 500 kilopascals at 60 degrees Celsius and at most about 500 kilopascals at −15 degrees Celsius. However, these are merely examples and other similar or different materials may also be used.

For purposes of this disclosure, the term stiffness is used to refer to a measure of resistance to deformation in response to an applied force. There may be a distinction between the stiffness of a material and the stiffness of a layer, section, structure, or portion. When referencing a material stiffness, the disclosure herein refers to a material property. A material stiffness depends on the material composition. When referencing the stiffness of the seatback 124 or of a layer, section, or portion of an object such as the seatback 124, additional factors may be involved that may affect the overall stiffness of what is being discussed. The additional factors may include, without limitation, one or more of thickness of any one or more of layers, sections, portions, or objects, the combination of different layers, sections, portions, or objects, or the presence of additional device, such as for example, an inflated bladder as discussed in more detail herein and/or the resistive elements 150. As such, the stiffness of a layer, section, portion, or object may be the same or different from the stiffness of just the material included in that layer, section, portion, or object. In examples described herein, the stiffness of a layer, section, portion, or object can be increased by compressing a layer of material.

In examples, as shown in FIG. 1, as the vehicle 102 begins to change velocity, for example, reduce its velocity due to braking and/or due to a collision with an object with the first end 112 of the vehicle 102, the first occupant 104A is restrained by a seatbelt 152A, which may prevent the first occupant 104A from being ejected from the seat 106A toward the second occupant 104B and/or the seat 106B. Although the second occupant 104B is wearing a seatbelt 152B, the seatbelt 152B, at least initially, does not restrain the second occupant 104B during the change in velocity and/or collision. Rather, at least the back 126 of the second occupant 104B will be forced toward the first portion 132 of the seatback 124 in the direction of travel.

In more detail, FIG. 1 depicts an example event, such as, for example, change in velocity, e.g., a deceleration, which may be caused by a sudden braking, collision, or the like. As shown in FIG. 1, the vehicle 102 is travelling at a velocity V in the first direction 114. A force, F, 154 opposing the direction of travel is applied to the first end of the vehicle 102 in a direction generally consistent with the second direction 116. The first occupant 104A is seated in the seat 106A facing in the direction of travel (i.e., the first direction 114), and the second occupant 104B is seated in the seat 106B facing opposite the direction of travel, for example, with the back 126 of the second occupant 104B facing the direction of travel. As shown, prior to the collision, the variable resistance supports 120 may be already configured in the first configuration and the second configuration, associated with the one or more characteristics of the occupants 104A and 104B as may be determined and actuated by the variable resistance control system 142, respectively.

The velocity of the back 126 of the second occupant 104B may be substantially the same as the velocity of the vehicle 102 immediately prior to the reduction of the velocity of the vehicle 102 due to braking and/or the collision. The velocity of the back 126 of the second occupant 104B may continue at this velocity until the back 126 of the second occupant 104B couples to the first portion 132 of the seatback 124, at which time, the velocity of the back 126 of the second occupant 104B may be subjected to an abrupt change in velocity as the seatback 124 stops the motion of the back 126 of the second occupant 104B. This abrupt change in velocity may increase the likelihood and/or the severity of injury to the second occupant 104B due to the collision. Further, a magnitude of the velocity experienced by the occupants 104 may be influenced by their unique characteristics, for example, such as varying weights between the occupants 104. In some examples, the stiffness of the seatback, as configured using the variable resistance support 120, is tailored or customized for improved resistance to this force experienced by the occupants 104. For example, the varied seatback configurations may lower the peak magnitude of the reaction forces, such as force due to acceleration and compression force, experienced by the occupant, based on characteristics of the occupant. In examples where stiffness of the resistive elements 150 exceeds an optimum resistance, as the optimum resistance corresponds to one or more characteristics of the occupant 104, this may lead to a peak reaction force against the back 126 of the occupant 104 being inadequately reduced in magnitude and thus subjecting the occupant 104 to an increased likelihood for injury and/or serious harm. For example, the variable resistance support 120 may be configured to provide too great a magnitude of resistance while the occupant 104 may be of too little magnitude of mass. In such instances, the variable resistance support 120 may not adequately compress and/or absorb forces imparted by the occupant 104.

In some examples, the seatback 124 equipped with the variable resistance support 120 may be configured to include the rigid element 138 disposed between the variable resistance support 120 and the first portion 132 of the seatback. The rigid element may resist deformation under reaction forces, such as force exerted by the back 126 of the second occupant 104B. The rigid element 138 may evenly transfer reaction forces to the resistive element 150 of the variable resistance support 120 which may result in a lower peak magnitude of the reaction forces, such as force due to acceleration and compression force, experienced by the occupant. The resistive elements 150 may be further configured relative to one or more characteristics of the occupants 104 to provide corresponding and/or tailored peak force reductions.

Figure 2A:
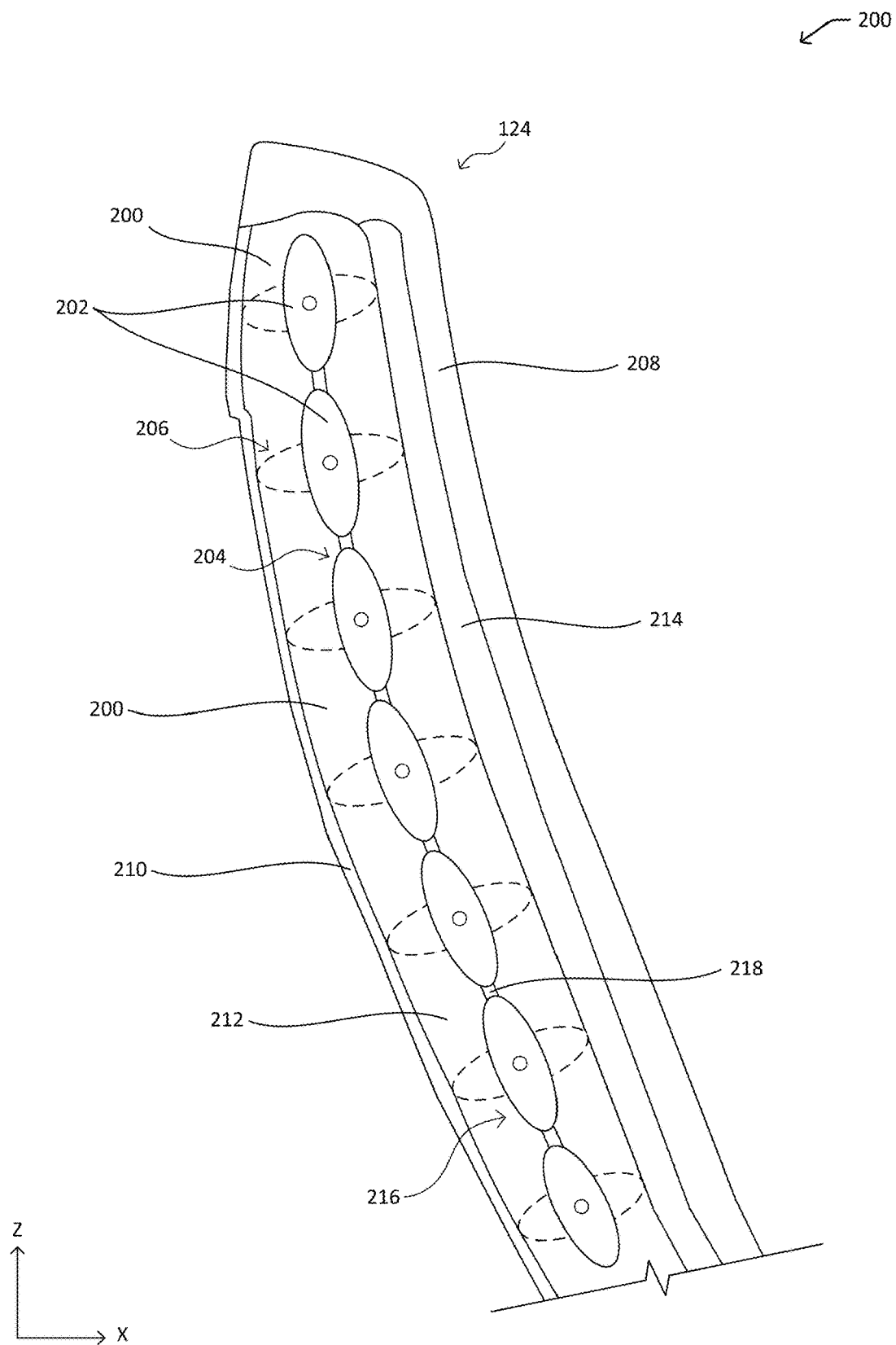
FIGS. 2A-2C are schematic views of examples of seatbacks and variable resistance control systems as described herein.

FIG. 2A shows an example variable resistance support 200 disposed within a section of the seatback 124, e.g., of a seat, such as the seat 106. The variable resistance support 200 may further include one or more resistive elements 202. In examples, the resistive elements 202 may be configured in a first state 204 or orientation. In some examples, the variable resistance support 200 may substantially correspond to the variable resistance support 120 shown in FIG. 1. Additionally, a second state 206 is depicted in dashed lines in FIG. 2A. In examples, as illustrated in FIG. 2A, the seatback 124 can have a front portion 208 which may substantially correspond to the front portion 132 shown in FIG. 1. The front portion 208 can be configured to face the back 126 of an occupant 104. The front portion 208 may be configured as one or more layers and/or sections. In examples, the one or more layers or sections can include a comfort foam and/or comfort material. In the illustrated example, the front portion 208 may be configured to have a single layer or section of a first material. The first material can be a comfort foam and/or comfort material. The first material can have a first material stiffness. In examples, the front portion 208 may be configured to have one or more layers and/or sections of the same or different comfort foam and/or comfort material. In examples, the layers or sections that make up the front portion 208 can have the same or different thicknesses. In examples, the layers or sections that make up the front portion 208 can be configured to exhibit the same or different stiffness. In examples in which seatback 124 is configured to have more than one portion, the stiffness of the front portion 208 may be lower than the stiffness of any other portion included in seatback 124. In examples where the front portion 208 includes one or more layers and/or sections, the overall stiffness of the front portion 208 can be lower than the overall stiffness of any other portion included in seatback 124.

In examples, as illustrated in FIG. 2A, seatback 124 may include a rear portion 210 in addition and opposite to the front portion 208. The rear portion 210 may be substantially similar to the rear portion 134 shown in FIG. 1. Like the front portion 208, the rear portion 210 may be configured as one or more layers and/or sections. In examples, the rear portion 210 may include, at least in part, one or more resistive elements. In examples, rear portion 210 may include one or more comfort foam and/or foam like materials. One or more comfort foam and/or foam like materials in the rear portion 210 may provide the same or different level of stiffness as the comfort foam and/or foam like material of the front portion 208. In examples, the rear portion 210 may be configured to have the same thickness as the front portion 208. In examples, the rear portion 210 may be configured to have a different thickness than the front portion 208. In examples, the rear portion 210 may be configured to have a thickness that is greater than the thickness of the front portion 208. In examples, the rear portion 210 may be configured to have a thickness that is smaller than the thickness of the front portion 208.

In examples, the front portion 208 and the rear portion 210 may at least partially define a volume 212. The volume 212 may be substantially similar to the volume 136 shown in FIG. 1. The volume 212 may be utilized to house and/or otherwise contain the variable resistance support 200 within the seatback 124.

As also illustrated in FIG. 2A, the seatback 124 may include a rigid element 214. The rigid element may be substantially similar to the rigid element 138 shown in FIG. 1. The rigid element 214 may be configured as one or more layers and/or sections. In examples, the rigid element 214 may include, at least in part, one or more deformation resistant elements. In examples, the rigid element 214 may be disposed within the volume 212 of the seatback 124. In such instances, the rigid element 214 may be disposed between the front portion 208 and the variable resistance support 200.

As shown in FIG. 2A, the variable resistance support 200 and/or the resistive elements 202 may be disposed in a first configuration 216. The first configuration 216 may include the resistive elements 202 positioned and/or oriented in the first state 204. In the first configuration 216, the resistive elements 202 may traverse less distance (e.g., substantially along the X-axis) within the volume 212. In some examples, the first configuration 216 may include the resistive element 202 positioned and/or oriented such that they do not, or do not substantially, make contact with the front portion 208 and the rear portion 210 of the seatback 124. In such instances, the resistive elements 202 may provide little to no resistance to any forces experienced by the seatback 124.

Figure 2B:
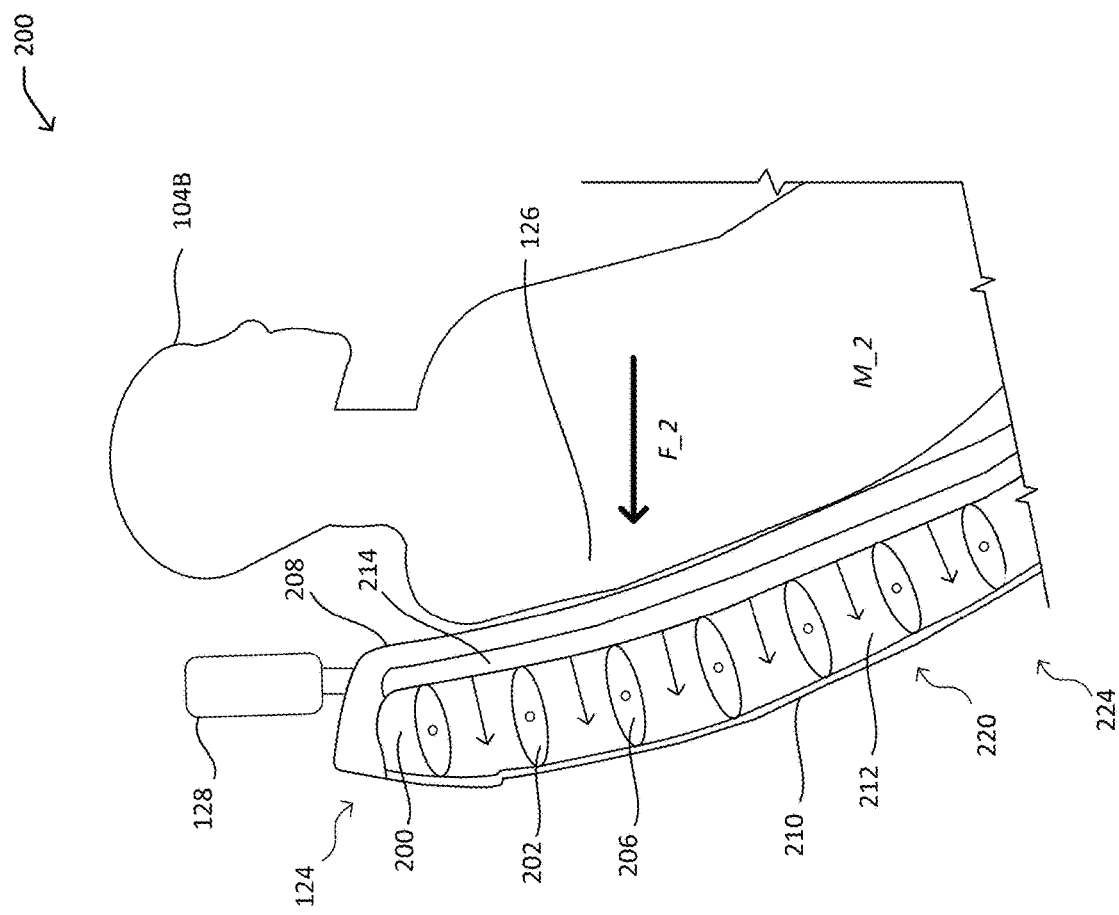
Figure 2C:
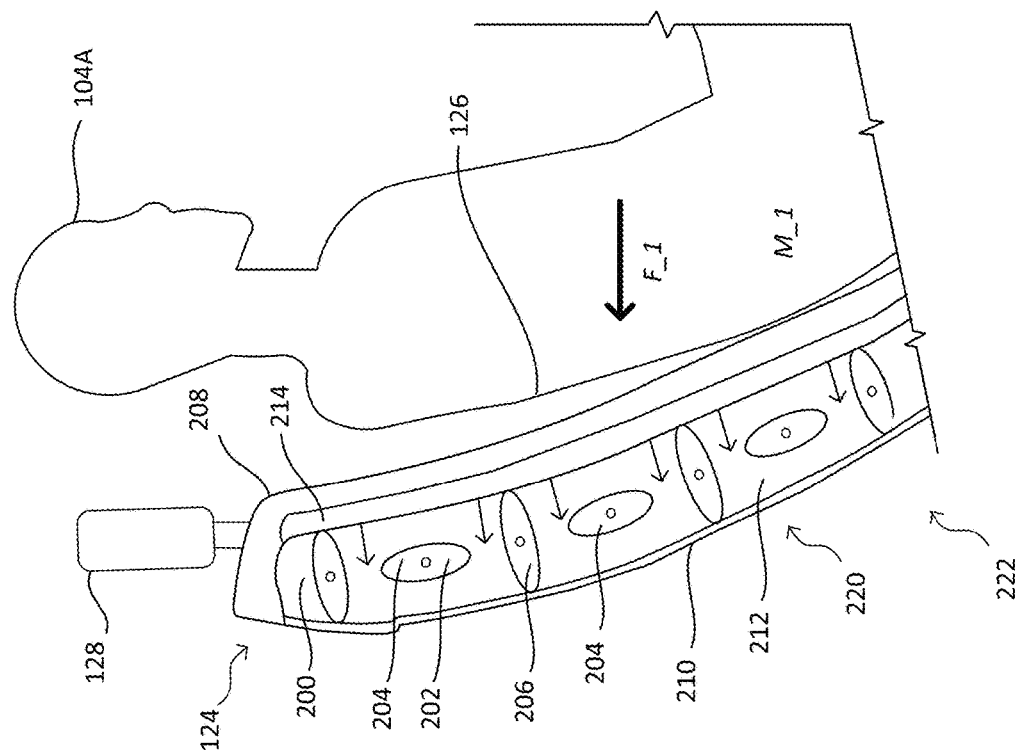

In further examples, the variable resistance support 200 and/or the resistive elements 202 may be actuated to one or more configurations including a second configuration 220 (depicted in FIGS. 2B and 2C). The second configuration 220 may include one or more of the resistive elements 202 positioned and/or oriented in the second state 206. In examples, the resistive elements 202 may be positioned and/or oriented between the first configuration 216 and the second configuration 220 independently. In such examples, the resistive elements 202 may be positioned and/or oriented individually (e.g., individual of the resistive elements 202 may be independently configurable, position-able, and/or the like). In further examples, the resistive elements 202 may be positioned and/or oriented between the first configuration 216 and the second configuration 220 in groups. In such instances, one or more of the resistive elements 202 may be connected via a linkage 218 and/or via one or more linkages. In such instances, the linkage 218 may connect one or more of the resistive elements 202. As such, the linkage 218 may be actuated to position and/or orient the resistive elements 202 between the first configuration 216 and the second configuration 220. In some implementations, the resistive elements 202 may be selectively coupled to or decoupled from the linkage, e.g., such that actuator of the linkage selectively causes movement, or no movement, of the respective resistive element 202.

FIGS. 2B and 2C show side views of example configurations of variable resistance supports 200 disposed within a seatback, such as seatback 124. The variable resistance supports 200 are shown with their respective resistive elements 202 in varying states and/or array configurations. In examples, the variable resistance support 200 may include a plurality of the resistive elements 202 configured to activate (e.g., actuate) between one or more states. Specifically, in the example of FIG. 2B, a first subset of the resistive elements 202 are disposed in the first state 204 and a second subset are disposed in the second state 206. In this example, the resistive elements 202 alternate (e.g., in the vertical direction) between the first state 204 and the second state 206. In contrast, in the example of FIG. 2B, all of resistive elements 202 are disposed in the first state 204. The seatback 124 in FIGS. 2B and 2C include the front portion 208 and the rear portion 210, the rear portion opposite the front portion 208. Further, the front portion 208 and the rear portion 210 at least partially define the volume 212. Additionally, FIGS. 2B and 2C show the rigid element 214. The rigid element 214 is shown to be disposed in the seatback 124 between the front portion 208 and the variable resistance support 200. Further, the rigid element 214 is shown to be disposed in the seatback 124 between the front portion 208 and the resistive elements 202. As depicted, the resistive elements 202 may at least partially contact the rigid element 214 and the rear portion 210 when disposed in the second state 206. The variable resistance support 200 as shown in FIGS. 2B and 2C are only examples. The variable resistance support 200 may be tuned to exhibit any desired stiffness performance. The thickness, structure design, and material used for any of the resistive elements 202 that forms the variable resistance support 200 can be selected based on the desired performance. In examples, the variable resistance support 200 can be configured to include one or more of the resistive elements 202. In examples, variable resistance support 200 may be configured to include one or more features such as one or more support structures, like a frame, a linkage system connecting the resistive elements 202, a controller and/or actuator, one or more materials that is not a comfort foam or a resistive element, or any combination thereof.

In examples, the stiffness of the variable resistance support 200 can be set by actuating the resistive elements 202 between a variety of states and/or array configurations. For example, the resistive elements 202 may initially reside in the first state 204 (e.g., the first configuration 216) as shown in FIG. 2A. Upon the sensors 140 detecting a mass exceeding a threshold value in the seat 106, which may be indicative of a presence of the occupant 104, the variable resistance control system 142 may activate the resistive elements 202 of the variable resistance support 200. For example, the first occupant 104A may sit in the seat 106 and the sensors may collect a first data of a first mass, $M\_1$. The first mass M/may exceed the threshold value indicative of a presence of the first occupant 104A in the seat 106. The variable resistance control system 142 may further determine a corresponding configuration of the resistive elements 202 based at least in part on the first mass $M\_1$. In examples, the variable resistance control system 142 may configure the array of the resistive elements 202, based at least in part on the first mass $M\_1$, to a partial configuration 222 (e.g., the second configuration 220). In examples, the partial configuration 222 may include an alternating configuration of the resistive elements 202 between the first state 204 and the second state 206. While an alternative configuration is shown as the partial configuration 222, other configurations are contemplated. In examples, the partial configuration 222 can include any configuration in which fewer than all of the resistive elements are in the second state 206. Further, other configurations are contemplated which relate and/or correspond to one or more characteristics of the first occupant 104A and/or occupants 104. Additionally, while the resistive elements 202 are shown to be configurable between the first state 204 and the second state 206, other states are contemplated.

In examples, the partial configuration 222 may be determined based at least in part on the first mass, $M\_1$, of the first occupant 104A. In examples, the partial configuration 222 may provide the variable resistance support 200 with a stiffness corresponding to a characteristic of the first occupant 104A such that the first occupant 104A may be less likely to experience harm and/or serious injury. For example, under certain collision conditions, the back 126 of the first occupant 104A may contact the front portion 208 of the seatback 124 with a first force, $F\_1$. A magnitude of the first force, $F\_1$, may correspond to the first mass, $M\_1$, of the first occupant 104A. In examples, the first force, $F\_1$, may be transferred to the rigid element 214. The rigid element 214 may further, evenly or substantially evenly, transfer the first force, $F\_1$, to the resistive elements 202 in the partial configuration 222.

In examples, the partial configuration 222 may have configured the array of the resistive elements 202 in a pattern of states corresponding to the one or more characteristics of the first occupant 104A. In examples, the front portion 208 and the rigid element 214 may invade the volume 212 which may be substantially similar to the volume 136 shown in FIG. 1. The rear portion 210 may be substantially fixed such as to provide resistance to the variable resistance support 200. In examples, the resistive elements in an active and/or the second state 206 may be loaded by the first force, $F\_1$, and compress within the volume 212 as may be defined by the rigid element 214 and the rear portion 210. The resistive elements 202 placed under compression from the first force, $F\_1$, may be configured to crush and/or deform in a way to reduce the first force, $F\_1$, experienced by the first occupant 104A. In examples, resistive elements 202, which may be configured to crush and/or deform in a way to reduce the first force, $F\_1$, may reduce the likelihood of injury and/or serious harm to the first occupant 104A.

Referring now to FIG. 2C, the resistive elements 202 may be configured in a state based at least in part on one or more characteristics of the occupant 104, as described herein. For example, the second occupant 104B may have a second mass, $M\_2$, which is greater than the first mass, $M\_1$, of the first occupant 104A. In examples, the variable resistance support 200 may have the array of the resistive elements 202 configured in a total configuration 224 (e.g., the second configuration 220) associated with the second mass, $M\_2$, of the second occupant 104B. The total configuration 224 may configure the array of the resistive elements 202 into the second state and/or any other configuration commensurate with the one or more characteristics of the second occupant 104B.

In examples, the total configuration 224 may be based at least in part on the second mass, $M\_2$, of the second occupant 104B. In examples, the total configuration 224 may provide the variable resistance support 200 with a stiffness corresponding to a characteristic of the second occupant 104B such that the second occupant 104B may be less likely to experience harm and/or serious injury. For example, under certain collision conditions, the back 126 of the second occupant 104B may contact the front portion 208 of the seatback 124 with a second force, $F\_2$. A magnitude of the second force, $F\_2$, may correspond to the second mass, $M\_2$, of the second occupant 104B. Additionally, the second force, $F\_2$, may be greater than the first force, $F\_1$. In examples, the second force, $F\_2$, may be transferred to the rigid element 214. The rigid element 214 may further, evenly or substantially evenly, transfer the second force, $F\_2$, to the resistive elements 202 in the total configuration 224.

In examples, where the second force, $F\_2$, is greater than the first force, $F\_1$, the second occupant 104B may need greater stiffness and/or energy absorption capability than the first occupant 104A to reduce and/or prevent injury or serious harm. In examples, the resistive elements 202 may be configured into a state corresponding to one or more characteristics of the occupant 104 to crush and/or deform, within the volume 212 which may be fixed, to accommodate for occupants 104 with varying energy absorption needs.

While absolute force is disclosed and referred to above, other forces are contemplated. For example, the variable resistance support 200 may actuate based at least in part on distributed forces. For example, distributed forces may be a function of mass and height. In such instances, the resistive elements 202 may be actuated at specific locations to accommodate locations that may experience greater distributed forces.

Figure 3B:
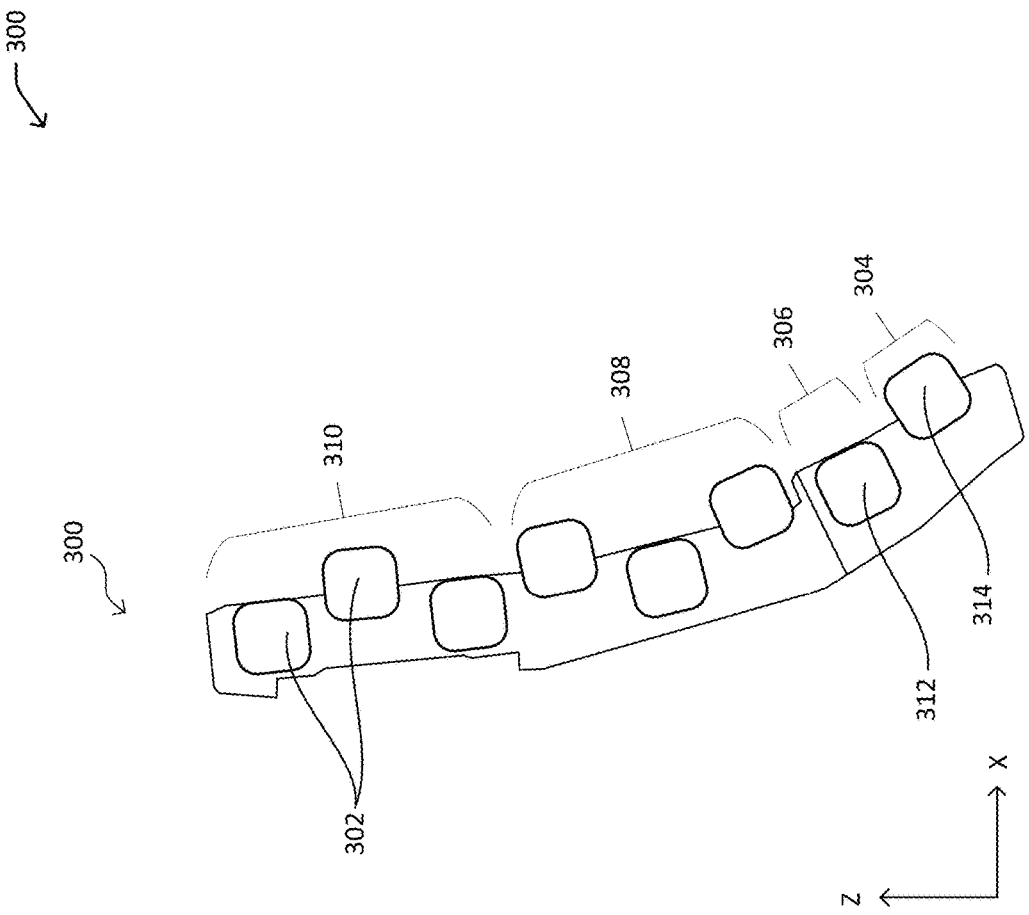
FIGS. 3A-3B are schematic views of an example variable resistance support as described herein.
Figure 3A:
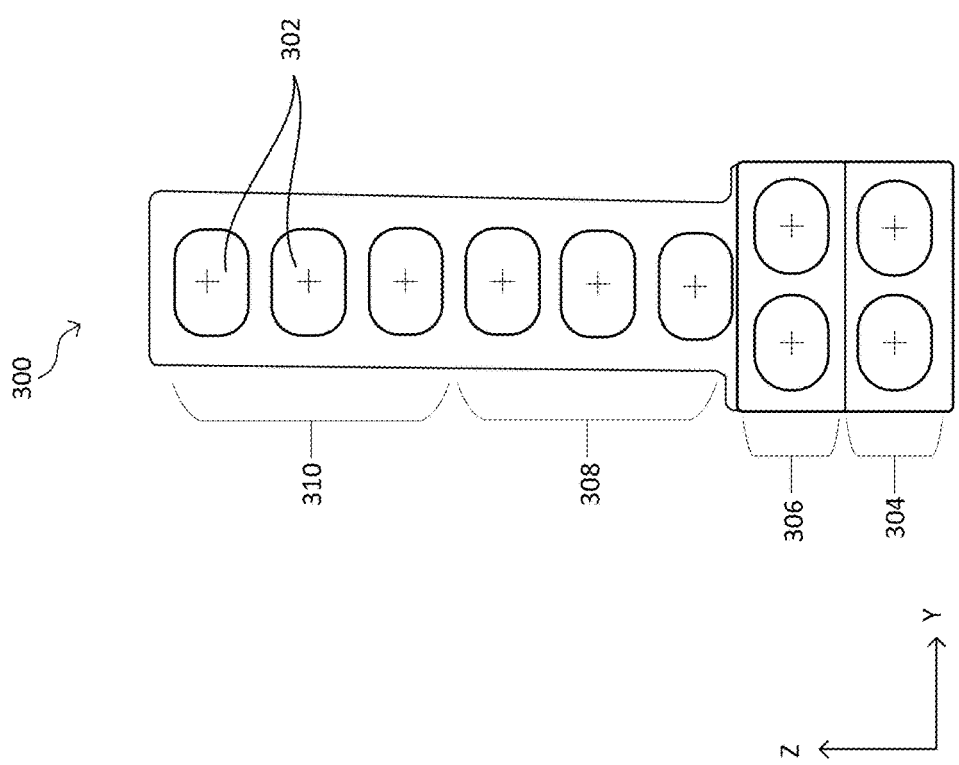

FIGS. 3A and 3B show respective front and side views of an example variable resistance support 300. The variable resistance support 300 includes a number and/or plurality of resistive elements 302, which may be an example of the resistive elements 150 shown in FIG. 1 and/or of the resistive elements 202 shown in FIGS. 2A-2C. The resistive elements 302 may be configurable, e.g., to provide different levels of stiffness. The resistive elements 302 may be selectively configured in two or more positions to provide a variable overall stiffness to a seatback in which the variable resistance support is disposed. As detailed herein, the resistive element 302 may be configured based at least in part on different characteristics of an occupant, for example, to provide correspondingly different levels of reaction forces between occupants with different masses and/or weights. In some examples, the variable resistance support 300 may substantially correspond to variable resistance support 120 shown in FIG. 1. In some examples, the resistive elements 302 may include one or more pelvic elements 304, one or more lumbar elements 306, one or more thoracic elements 308, and/or one or more cervical elements 310 configured to substantially correspond to a pelvic region, a lumbar region, a thoracic region, and/or a cervical region, respectively, of the back 126 of the occupant 104. In some examples, the resistive elements 302 may be substantially the same, e.g., they may all have approximately the same stiffnesses. In other examples, however, the stiffness of the resistive elements 302 can vary. For example, and without limitation, the one or more pelvic elements 304 may be relatively stiffer than the one or more lumbar elements 306, the lumbar elements 306 may be relatively stiffer than the one or more thoracic elements 308, and/or the thoracic elements 308 may be relatively stiffer than the cervical elements 310. Other relative stiffness combinations are contemplated.

Although the examples shown in FIGS. 3A and 3B include example resistive elements 302 arranged in one example array (e.g., certain numbers of resistive elements 302 spanning across the X and Y axis), other arrays are contemplated, such as, for example, spanning the X and Y axis N times, where N represents any whole integer of resistive elements 302. As illustrated in FIG. 3B, individual of the resistive elements 302 are configurable between two or more states including a first state 312 (e.g., inactive state) and a second state 314 (e.g., active state). In examples, where the resistive elements 302 are in the inactive state 312, the resistive elements 302 may not contribute to the stiffness of the variable resistance support 300. In examples, the resistive elements 302 may be configured in the inactive state 312 if a presence of the occupant 104 has not been determined. In further examples, the resistive elements 302 may be configured to be in the inactive state 312 if one or more characteristics of the occupant 104 are below a threshold value.

In examples, where the resistive elements 302 are in the active state 314, one or more of the resistive elements 302 may provide resistance to the variable resistance support 300. In examples, the resistive elements 302 may be configured to be in the active state 314 if a presence of the occupant 104 has been determined. In further examples, the resistive elements 302 may be configured to be in the active state 314 based at least in part on one or more characteristics of the occupant 104 being below or equal to or above a threshold value. For example, a presence of the occupant 104 may be determined and the resistive elements 302 may be configured to be in a first configuration of the active state 314 where one or more characteristics of the occupant 104 are determined to be below the threshold value. In further examples, the resistive elements 302 may be configured into a plurality of configurations of the active state 314. For example, one or more of the resistive elements 302 may be actuated into the active state 314 corresponding to one or more characteristics of the occupant 104 and providing variable resistance and/or stiffness within the variable resistance support 300. In the example depicted, the resistive elements 302 in the active state 312 are configured to protrude toward the back 126 of the occupant 104. Other examples of actuating the resistive elements 302 between the inactive state 312 to the active state 314 are contemplated.

In some instances, the variable resistance support 300 may be controlled by the variable resistance control system 142. The variable resistance control system 142 may, via the variable resistance controller 148, reconfigure the resistive elements 302 between the first state 312 and the second state 314. The first state 312 may represent an inactive state whereby the resistive element 302 may provide minor and/or no stiffness to the seatback 124. Accordingly, the second state 314 may represent an active state whereby the resistive element 302 may provide a stiffness to the seatback 124. Although the examples shown in FIG. 3B include example resistive elements 302 alternating between the first state 312 and the second state 314, other patterns are contemplated. Additionally, although the examples include the first state 312 and the second state 314, other states are contemplated, such as, for example, partial states incrementally different between the first state 312 and the second state 314 with incrementally different associated stiffnesses.

The resistive elements 302 may be configured through a variety of patterns and states via the variable resistance controller 148. The variable resistance controller 148 may actuate the resistive elements 302 individually, grouped, and/or in any other configuration. The variable resistance controller 148 may actuate the resistive elements 302 into varying configurations using an electric motor, a hydraulic cylinder, a piezoelectric actuator, a screw jack, and/or any combination thereof and of the like. Although the examples shown include example resistive elements 302 actuating between the first state 312 and the second state 314 in a substantially linear path, other methods and/or techniques of actuation are contemplated. For example, the resistive elements 302 may be rotated, take an angled approach, take a curved path, etc. Although the examples shown in FIGS. 3A and 3B include example resistive elements 302 having a substantially square-shaped cross-section, other cross-sectional shapes are contemplated, such as, for example, rectangular-shaped, circular-shaped, oval-shaped, cone-shaped, etc.

In examples, one or more of the at least one resistive element 302 may include one or more layers of material, one or more plates of material, one or more cones of material, and/or one or more tubes of material (e.g., tubes having a circular cross-section, rectangular cross-section or other cross-section). In some examples including one or more layers of material, the one or more layers may have different thicknesses, and/or the layers may have a thickness that varies across the area of the layer. For example, the layers may include one or more layers formed in a honeycomb-like form and/or an eggcrate-like form. In some examples, the one or more resistive elements 302 may include plastics, foams (e.g., polypropylene foam), aluminum alloys, corrugated aluminum wire, etc. In some examples, the one or more resistive elements 302 may include thin-walled shapes having a hollow and/or substantially hollow interior. In some other examples, the hollow and/or substantially hollow interior of the one or more resistive elements 302 may be filled with a medium including air, compressed air, liquids, gels, etc.

In some examples, the at least one resistive element 302 may include a first crushable element and a second crushable element, and the shape, the thickness, the construction, the stiffness, and/or the materials of the first crushable element and the second crushable element may differ from one another. For example, the first crushable element may be coupled to the second crushable element in a stacked orientation facing the back 126 of the occupant 104. In some examples, the at least one resistive element 302 may include a first crushable zone having a first crush stiffness and a second crushable zone having a second crush stiffness greater than the first crush stiffness. In some such examples, the first crushable zone may be closer to the seat base 122 than the second crushable zone, for example, to provide a relatively stiffer support for the pelvic region than the lumbar region, the thoracic region, and/or the cervical region.

Other implementation of the variable resistance support are also contemplated. In examples, an example variable resistance support 400 may include a bladder structure 402. The bladder structure 402 may further include one or more inflatable bladders 404A-F that are connected to each other. FIGS. 4A and 4B illustrate an alternative example of a variable resistance support 400. The variable resistance support 400 may be an example of the variable resistance support 120, like the variable resistance support 200 and/or the variable resistance support 300. The variable resistance support 400 may include the bladder structure 402 which may further include six inflatable bladders 404A, 404B, 404C, 404D, 404E, 404F. The inflatable bladders 404 may extend generally horizontally (e.g., along the X-axis) from a first side to a second side opposite the first side. In examples, the inflatable bladders 404 may extend vertically (e.g., along the Y-axis) from a third side to a fourth side opposite the third side. In further examples, the inflatable bladders 404 may be arranged otherwise, e.g., aligned in a vertical direction, or the like. In other examples, the inflatable bladders 404 may be arranged in a horizontal direction.

The inflatable bladders 404 may further include five seams 406A, 406B, 406C, 406D, and 406 E. The seams 406 may divide the bladder structure 402 into the inflatable bladders 404. The seams 406 may generally extend horizontally between the first side to the second side. In other examples, the seams 406 may generally extend vertically between the third side and the fourth side. While the seams 406 are illustrated as being generally linear, other configurations of the seams 406 are contemplated. For example, the seams 406 may be arranged in a diamond pattern which may configure the inflatable bladders 404 into diamond shapes.

The inflatable bladders 404 may be further subdivided into any number of individual inflatable bladders including one or more individual inflatable bladders 404A-N, where N is any whole integer. The illustration of six individual inflatable bladders is simply an example. The one or more inflatable bladders 404 can have any desired shape and/or be arranged in any orientation. In examples, an inflatable bladder can be circular, oval, square, diamond, rectangular, polygonal, or have any regular or irregular shape. In examples, the shape of the inflatable bladders 404 can be selected based on the shape of the seatback 124, the intended location for the inflatable bladder, the size of the inflatable bladder, or any combination thereof. In examples, one or more restraining means (not shown) such as tethers, belts, ribs or like structures can be included inside, outside, or both inside and outside of the one or more inflatable bladders to ensure that when deployed an inflatable bladder can maintain a desired shape, size, or both. Using one or more restraining means can be advantageous in the event an inflatable bladder is over pressurized. In examples, having one or more restraining means included in the one or more inflatable bladders can help avoid compressing the resistive elements during deployment of the one or more inflatable bladders. In examples, one or more restraining means may be configured to also define one or more chambers in the one or more inflatable bladders 404.

In examples, the bladder structure 402 may be a contiguous bladder structure (e.g., a single bladder structure). In examples, the bladder structure 402 may include two individual inflatable bladders or more than three individual inflatable bladders. In examples, the bladder structure 402 may extend across one or more regions of the seatback 124.

In examples, the bladder structure 402 may be positioned so that one or more individual inflatable bladders may be located at a particular region. For example, the bladder structure 402 may be positioned and/or configured such that at least one individual inflatable bladder is located at the lumbar region. In examples, the bladder structure 402 may be positioned and/or configured such that at least one individual inflatable bladder is located at the lumbar region, and at least one other individual inflatable bladder is located at the thoracic region and/or at the pelvic region. In examples, the individual inflatable bladders 404 of the bladder structure 402 may be separated by one or more seams 406 (e.g., 406-E). In examples, the seam 406 may include a weaved material, stitching, hook-and-loop fastener like Velcro, adhesive, a mechanical separator such as a clip or like constricting mechanism, or any like structure.

In examples, as depicted, the seam 406 may be configured to allow flow between one or more individual inflatable bladders 404 at desired instances. In some examples, allowing flow between one or more individual inflatable bladders 404 may via valving between one or more of the individual bladders 404, independent inflators for individual inflatable bladders, and/or the like. In further examples, the seams 406 may be configured to separate and allow flow between one or more of the inflatable bladders 404 under certain conditions. For example, the seams 406 may be configured to come undone or open when the pressure inside at least one individual inflatable bladder 404 defined by the seams 406 reaches or exceeds a threshold pressure resulting from forces applied to the seatback 124. In examples, the seams 406 may include stitching configured to tear or loosen, a weaved fabric configured to separate, an adhesive configured to detach, a mechanical separator configured to yield, a pressure release valve, or any combination thereof when the pressure of an adjacent inflatable bladder exceeds a threshold pressure. In examples, all seams 406 in a contiguous bladder structure may come undone in case of an event. In examples, in case of an event, the one or more seams 406 come undone or open and the one or more individual inflatable bladders 404 are connected to form the bladder structure 402 that extends across one or more regions of the seatback 124.

For example, in case of an event, one or more seams 406 may come undone and/or open to allow inflation of one or more inflatable bladders 404 that are part of the bladder structure 402. In this manner, it may be possible to inflate the bladder structure 402 as one contiguous inflatable bladder extending across one or more regions of seatback 124.

In examples, in cases where the seams 406 comes undone or open, service may be required to replace the bladder structure 402. In the alternative, in examples, the seams 406 may be reversible and after the seams 406 comes undone or opens, the seams 406 may be configured to return to its closed state after the individual inflatable bladders 404 are deflated and again separate the bladder structure 402 into one or more of the individual inflatable bladders 404. For example, the seams 406 may include a mechanical separator that returns to a stowed or undeployed state, an adhesive that is able to bond again after being detached, a hook-and-loop fastener that is able to reconnect after it has been pulled apart or opened or any like device.

In examples, the variable resistance support 400 may include one or more inflatable bladders 404 inflatable by one or more expansion devices 408 (e.g., valves). In examples, as illustrated in FIG. 4A, the variable resistance support 400 may include multiple inflatable bladders 404A-F connected by one or more expansion devices 408 (e.g., 412A-F). In examples, one inflatable bladder may be connected to at least one other inflatable bladder by one or more expansion devices 408. In examples, multiple inflatable bladders may be connected in series and located in seatback 124 to extend to one or more regions of seatback 124. In examples, the expansion devices 408 may be configured to allow flow between inflatable bladders it connects when the pressure inside one connected inflatable bladder is above at threshold pressure. In examples, the expansion devices 408 may be a one-way valve allowing flow only in one direction. In examples, the expansion device 408 is a two-way valve. In examples, the one or more expansion devices 408 may be reversable or be configured to be operated in reverse. In examples the one or more expansion devices 408 may be configured to be operated to exhaust and/or to deflate the one or more inflatable bladders 404. For example, the one or more expansion devices 408 can be triggered to exhaust any inflating media from one or more inflatable bladders 404. The one or more expansion devices 408 may be operably connected to and/or in flow communication with one or more fluid and/or solid fuel sources. The one or more expansion devices 408 may be located in any convenient location. In examples, one or more expansion devices 408 are located in seatback 124 at a location that is off-center with respect to back 126 of a seated occupant 104. In examples, one or more expansion devices 408 are located in seatback 124 outside an area against which at least a portion of back 126 of an occupant 104 presses during a collision or change of velocity event of a vehicle 102.

The inflating media used by the one or more expansion devices 408 can be a fluid such as a liquid, a gas, or a combination thereof. The inflating media used by the one or more expansion devices 408 can be a solid fuel. In examples, one or more expansion devices 408 can use combination of fluid and solid. The inflating medium can be a single compound, a mixture of compounds, or a solution. In examples, the fluid can be air. In examples, the fluid can be argon gas. In examples, the fluid can be nitrogen. In examples the fluid can be liquid nitrogen. In examples the fluid can be $CO_2$, for example compressed carbon dioxide. In examples the solid fuel can be sodium azide.

In examples, the one or more inflatable bladders 404 may be tuned to provide different levels of stiffness substantially corresponding to different characteristics of an occupant 104, for example, to provide correspondingly different levels of reaction forces between occupants 104 with different levels of mass and/or weight. In some examples, the one or more inflatable bladders 404 may all have equal stiffnesses. In such instances, the rigid element 138 may evenly distribute a force applied by the back 126 of the occupant 104 to the one or more inflatable bladders 404 of the variable resistance support 400. Other relative stiffness combinations are contemplated. In other examples, the one or more inflatable bladders 404 may be variably pressurized based at least in part on the mass of the occupant 104. In other examples, the one or more inflatable bladders 404 may be variably pressurized based at least in part on one or more characteristics of the occupant 104. In still other examples, the Although the examples shown in FIGS. 4A and 4B include examples of the one or more inflatable bladders 404 arranged in an example array (e.g., certain numbers of the one or more inflatable bladders spanning the Y axis), other arrays are contemplated, such as, for example, spanning both the X and Y axis N times, where N represents any whole integer of one or more inflatable bladders 404. As illustrated in FIG. 4B, individual of the one or more inflatable bladders 404 may be configured between an inactive state 410 (e.g., deflated state) and an active state 412 (e.g., inflated state). In some instances, the variable resistance support 400 may be controlled by the variable resistance control system 142. The variable resistance control system 142 may, via the variable resistance controller 148, reconfigure the one or more inflatable bladders 404 between the inactive state 410 and the active state 412. The inactive state 410 may represent a deflated state whereby the one or more inflatable bladders 404 may not provide a stiffness to the seatback 124. Accordingly, the active state 412 may represent an active state whereby the one or more inflatable bladders 404 may provide a stiffness to the seatback 124. Although the examples shown in FIG. 2B include example one or more inflatable bladders 404 alternating between the inactive state 410 and the active state 412, other patterns are contemplated. Additionally, although the examples include the inactive state 410 and the active state 412, other states are contemplated, such as, for example, partial states incrementally different between the inactive state 410 and the active state 412. Accordingly or alternatively, the active state 412 may incorporate partial states of inflation of the one or more inflatable bladders 404.

In examples, variable resistance control system 142 and/or the variable resistance controller 148 can control the pressure (e.g., control through partial states of inflation) at which one or more inflatable bladders 404 are inflated. In examples, one or more inflatable bladders 404 are pressurized at about 22 kPa. In examples, one or more inflatable bladders 404 are pressurized at about 10 kPa, 15 kPa, 20 kPa, 25 kPa, 30 kPa, 40 kPa, 50 kPa, 100 kPa, 105 kPa, 200 kPa, or 510 kPa. These pressures are only an example. In examples, one or more inflatable bladders 404 is sufficiently pressurized to compress at least a portion of one or more layers or sections of comfortable foam or comfort material that is proximate, adjacent, or in the vicinity of the variable resistance support 400. In examples, one or more inflatable bladders 404 is inflated to a volume of 0.6 liters.

The one or more inflatable bladders 404 may be configured through a variety of patterns and states via the variable resistance controller 148. The variable resistance controller 148 may actuate the one or more inflatable bladders 404 individually, grouped, and/or in any other configuration. The variable resistance controller 148 may actuate the one or more inflatable bladders 404. In examples, the one or more inflatable bladders 404 can be independently controlled and/or operated. In examples, where variable resistance support 400 is configured with one or more inflatable bladders 404 located in seatback 124, the one or more inflatable bladders 404 can be deployed simultaneously, at different times, selectively, or any combination thereof. Selective deployment may include the deployment of at least one but not all, of the one or more inflatable bladders 404. In examples, during normal vehicle operation, the one or more inflatable bladders 404 may be configured to reversible inflate and deflate based on a control input.

FIGS. 4C and 4D show respective side views of example seatbacks including the variable resistance supports 400 with their respective one or more inflatable bladders 404 in varying states and/or array configurations. In examples, the variable resistance support 400 may include a plurality of the one or more inflatable bladders 404 configured to activate (e.g., inflate and/or deflate) between one or more states. The variable resistance support 400 as shown in FIGS. 4A and 4B are only examples. The variable resistance support 400 may be tuned to exhibit any desired stiffness performance. The thickness, structure design, and material used for any one or more inflatable bladders 404 that forms the variable resistance support 400 can be selected based on the desired performance. In examples, variable resistance support 400 may be configured to include one or more features such as one or more support structures, like a frame, a linkage system connecting the one or more inflatable bladders 404, a controller and/or actuator, one or more materials that is not a comfort foam or a resistive element, or any combination thereof.

In examples, the stiffness of the variable resistance support 400 can be set by actuating the one or more inflatable bladders 404 between a variety of states and/or array configurations. For example, the one or more inflatable bladders 404 may initially reside in the inactive state 410 as shown in FIG. 4C. Upon the sensors 140 detecting a mass exceeding a threshold value in the seat 106, which may be indicative of a presence of the occupant 104, the variable resistance control system 142 may activate the one or more inflatable bladders 404 of the variable resistance support 400. For example, the first occupant 104A may sit in the seat 106 and the sensors may collect a first data of a first mass, $M\_1$. The first mass $M\_1$ may exceed the threshold value indicative of a presence of the first occupant 104A in the seat 106. The variable resistance control system 142 may further determine a corresponding configuration of the one or more inflatable bladders 404 based at least in part on the first mass $M\_1$. In examples, the variable resistance control system 142 may configure the array of the one or more inflatable bladders 404, based at least in part on the first mass $M\_1$, to a first array 414. In examples, the first array 414 may include an alternating configuration of the one or more inflatable bladders 404 between the inactive state 410 and the active state 412. While an alternative configuration is shown as the first array 414, other configurations are contemplated. Further, other configurations are contemplated which relate and/or correspond to one or more characteristics of the first occupant 104A and/or occupants 104. Additionally, while the one or more inflatable bladders 404 are shown to be configurable between the inactive state 410 and the active state 412, other states are contemplated. For example, the active state 412 may include partially inflated states providing variable stiffnesses associated with the partial inflation.

In examples, the first array 414 may correspond to the first mass, $M\_1$, of the first occupant 104A. In examples, the first array 414 may provide the variable resistance support 400 with a stiffness corresponding to a characteristic of the first occupant 104A such that the first occupant 104A may be less likely to experience harm and/or serious injury. For example, under certain collision conditions, the back 126 of the first occupant 104A may contact the front portion 208 of the seatback 124 with a first force, $F\_1$. A magnitude of the first force, $F\_1$, may correspond to the first mass, $M\_1$, of the first occupant 104A. In examples, the first force, $F\_1$, may be transferred to the rigid element 214. The rigid element 214 may further, evenly or substantially evenly, transfer the first force, $F\_1$, to the one or more inflatable bladders 404 in the first array 414.

In examples, the first array 414 may have configured the array of the one or more inflatable bladders 404 in a pattern of states corresponding to the one or more characteristics of the first occupant 104A. In examples, the front portion 208 and the rigid element 214 may invade the volume 212 which may be substantially similar to the volume 136 shown in FIG. 1. The rear portion 210 may be substantially fixed such as to provide resistance to the variable resistance support 400. In examples, the resistive elements in the inactive state 410 and/or the active state 412 may be loaded by the first force, $F\_1$, and compress within the volume 212 as may be defined by the rigid element 214 and the rear portion 210. The one or more inflatable bladders 404 placed under compression from the first force, $F\_1$, may be configured to compress and/or deform in a way to reduce the first force, $F\_1$, experienced by the first occupant 104A. In examples, the one or more inflatable bladders 404, which may be configured to compress and/or deform in a way to reduce the first force, $F\_1$, may reduce the likelihood of injury and/or serious harm to the first occupant 104A.

Referring now to FIG. 4D, the one or more inflatable bladders 404 may be configured in a state based at least in part on one or more characteristics of the occupant 104, as described herein. For example, the second occupant 104B may have a second mass, $M\_2$, which is greater than the first mass, $M\_1$, of the first occupant 104A. In examples, the variable resistance support 400 may have an array of the one or more inflatable bladders 404 configured in a second array 416 associated with the second mass, $M\_2$, of the second occupant 104B. The second array 416 may configure the array of the one or more inflatable bladders 404 into the active state 412 and/or any other configuration commensurate with the one or more characteristics of the second occupant 104B.

In examples, the second array 416 may correspond to the first mass, $M\_2$, of the second occupant 104B. In examples, the second array 416 may provide the variable resistance support 400 with a stiffness corresponding to a characteristic of the second occupant 104B such that the second occupant 104B may be less likely to experience harm and/or serious injury. For example, under certain collision conditions, the back 126 of the second occupant 104B may contact the front portion 208 of the seatback 124 with a second force, $F\_2$. A magnitude of the second force, $F\_2$, may correspond to the second mass, $M\_2$, of the second occupant 104B. Additionally, the second force, $F\_2$, may be greater than the first force, $F\_1$. In examples, the second force, $F\_2$, may be transferred to the rigid element 214. The rigid element 214 may further, evenly or substantially evenly, transfer the second force, $F\_2$, to the one or more inflatable bladders 404 in the second array 416.

In examples, where the second force, $F\_2$, is greater than the first force, $F\_1$, the second occupant 104B may need greater stiffness and/or energy absorption capability than the first occupant 104A to reduce and/or prevent injury or serious harm. In examples, the one or more inflatable bladders 404 may be configured into a state corresponding to one or more characteristics of the occupant 104 to compress and/or deform, within the volume 212 which may be fixed, to accommodate for occupants 104 with varying energy absorption needs.

Figure 5:
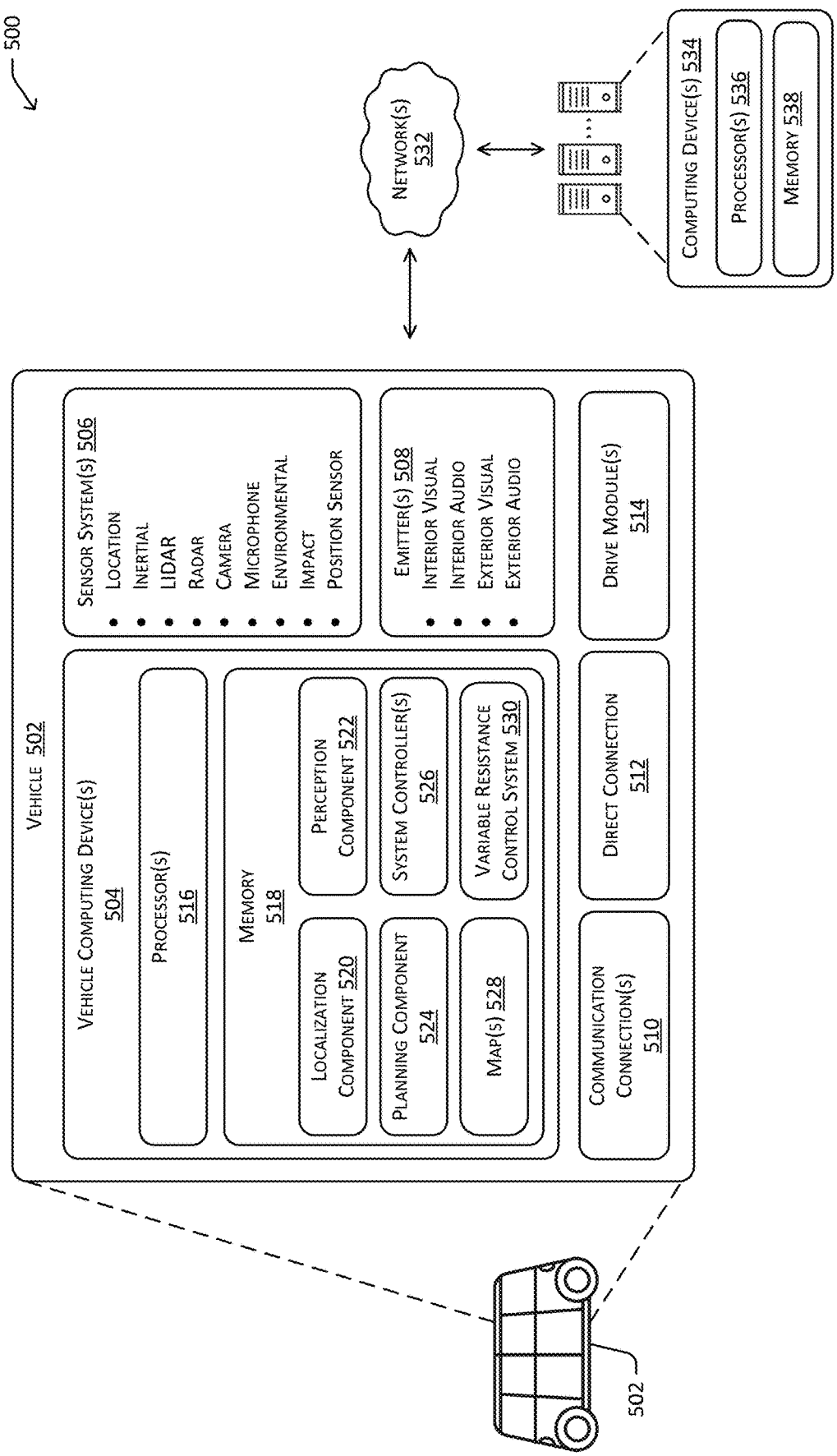
FIG. 5 is a block diagram of an example system architecture for implementing the example techniques described herein.

FIG. 5 is a block diagram of an example system 500 including architecture for implementing the example techniques described herein. In at least some examples, the system 500 may include a vehicle 502, which may correspond to the example vehicle 102 shown in FIG. 1. The vehicle 502 may include a vehicle computing device 504, one or more sensor system(s) 506, one or more emitters 508, one or more communication connection(s) 510, at least one direct connection 512, and one or more drive modules 514. The vehicle computing device 504 may include one or more processors 516 and memory 518 communicatively coupled with the one or more processors 516. In the illustrated example, the vehicle 502 is an autonomous vehicle. However, the vehicle 502 may be any other type of vehicle. In the illustrated example, the memory 518 of the vehicle computing device 504 stores a localization component 520, a perception component 522, a planning component 524, one or more system controllers 526, one or more map(s) 528, and a variable resistance control system 530. Though depicted in FIG. 5 as residing in memory 518 for illustrative purposes, it is contemplated that the localization component 520, the perception component 522, the planning component 524, the one or more system controllers 526, the one or more maps 528, and the variable resistance control system 530 may additionally, or alternatively, be accessible to the vehicle 502 (e.g., stored on, or otherwise accessible by, memory remote from the vehicle 502).

In some examples, the one or more of sensor system(s) 506, the localization component 520, the perception component 522, or the planning component 524 may generate one or more triggering signals due to a predicted collision or actual collision involving the vehicle 502. For example, one or more of the sensor system(s) 506 may generate one or more signals indicative of an object (e.g., another vehicle, a wall, a guardrail, a bridge support, a utility pole, and/or a pedestrian) and communicate the one or more signals to the perception component 522 and/or the planning component 524, which may predict a collision with an object in the environment through which the vehicle 502 is travelling.

Regarding the example system 500 shown in FIG. 5 in at least some examples, the localization component 520 may be configured to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment and may continuously determine a location and/or orientation of the autonomous vehicle within the map. In some examples, the localization component 520 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 520 may provide data to various components of the vehicle 502 to determine an initial position of an autonomous vehicle for generating a candidate trajectory, as discussed herein.

In some examples, the perception component 522 may be configured to perform object detection, segmentation, and/or classification. In some examples, the perception component 522 may provide processed sensor data that indicates a presence of an entity that is proximate to the vehicle 502 and/or a classification of the entity as an entity type (e.g., car, pedestrian, cyclist, animal, building, tree, road surface, curb, sidewalk, unknown, etc.). In additional and/or alternative examples, the perception component 522 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 524 may generate an instruction for guiding the autonomous vehicle along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In at least one example, the planning component 524 may determine a location of a user based on image data of an environment received from the user using, for example, bags of binary words with image-based features, artificial neural network, and the like. Further, the planning component 524 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 502 may stop to pick up a passenger. In at least one example, the planning component 524 may determine a pickup location based at least in part on determining a user identity (e.g., determined via image recognition or received as an indication from a user device, as discussed herein).

The vehicle computing device 504 also includes the system controller(s) 526, which may be configured to control steering, propulsion, braking, safety, emitters, communication, and other systems of the vehicle 502. These system controller(s) 526 may communicate with and/or control corresponding systems of the drive module(s) 514 and/or other components of the vehicle 502.

The map(s) 528 may be used by the vehicle 502 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment and may be loaded into working memory as needed. In at least one example, the one or more maps 528 may include at least one map (e.g., images and/or a mesh). In some examples, the vehicle 502 may be controlled based at least in part on the maps 528. That is, the maps 528 may be used in connection with the localization component 520, the perception component 522, and/or the planning component 524 to determine a location of the vehicle 502, identify objects in an environment, and/or generate routes and/or trajectories to navigate within an environment.

In some examples, the one or more map(s) 528 may be stored on a remote computing device(s) (such as computing device(s) 534) accessible via one or more network(s) 532. In some examples, multiple maps 528 may be stored based on, for example, a characteristic (e.g., type of entity, time of day, day of week, season of the year, etc.). Storing multiple maps 528 may have similar memory requirements but increase the speed at which data in a map may be accessed.

The variable resistance control system 530 may be the same as the variable resistance control system 142 detailed above. For instance, and without limitation, the variable resistance control system 530 can include functionality to determine a collision event, determine occupant characteristics (e.g., mass, height, weight distribution, seating orientation, etc.), determine the presence of occupant(s) in the vehicle 502, and/or determine a direction of travel of the vehicle. Based at least in part on any of this information, all of this information, and/or any other information, the variable resistance control system 530 can adjust stiffness in the variable resistance support 120 of the seatback 124 to absorb collision energy between the seatback and the occupant, e.g., to prevent injury to the occupant of the vehicle 502. Other functionality of the variable resistance control system 530 is detailed further herein.

In some examples, aspects of some or all of the components discussed herein may include any models, algorithms, and/or machine learning algorithms. For example, in some examples, the components in the memory 518 and/or the memory 538 may be implemented as a neural network.

As described herein, an exemplary neural network is a biologically inspired algorithm which passes input data through a series of connected layers to produce an output. Each layer in a neural network may also include another neural network or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 506 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. Without limitation, the sensor system(s) 506 can include the sensors 140 discussed above. The sensor system(s) 506 may include multiple examples of each of these or other types of sensors. For example, the LIDAR sensors may include individual LIDAR sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or alternatively, the sensor system(s) 506 may send sensor data, via the one or more networks 532, to the one or more computing device(s) 534 at a particular frequency, after a lapse of a predetermined period of time, in near real-time, etc.

The emitter(s) 508 may be configured to emit light and/or sound. The emitters 508 in this example include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The communication connection(s) 510 enable communication between the vehicle 502 and one or more other local or remote computing device(s). For example, the communication connection(s) 510 may facilitate communication with other local computing device(s) on the vehicle 502 and/or the drive module(s) 514. Also, the communication connection(s) 510 may allow the vehicle 502 to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 532. For example, the communications connection(s) 510 may enable Wi-Fi-based communication, such as via frequencies defined by the IEEE 502.11 standards, short range wireless frequencies such as Bluetooth®, cellular communication (e.g., 2G, 3G, 4G, 4G LTE, 6G, etc.) or any suitable wired or wireless communications protocol that enables the respective computing device to interface with the other computing device(s).

In at least one example, the direct connection 512 may provide a physical interface to couple the one or more drive module(s) 514 with the body of the vehicle 502. For example, the direct connection 512 may allow the transfer of energy, fluids, air, data, etc. between the drive module(s) 514 and the vehicle 502. In some examples, the direct connection 512 may further releasably secure the drive module(s) 514 to the body of the vehicle 502.

In at least one example, the vehicle 502 may include the drive module(s) 514. In some examples, the vehicle 502 may have a single drive module 514. In at least one example, if the vehicle 502 has multiple drive modules 514, individual drive modules 514 may be positioned on opposite ends of the vehicle 502 (e.g., the leading end and the rear, etc.). In at least one example, the drive module(s) 514 may include one or more sensor systems to detect conditions of the drive module(s) 514 and/or the surroundings of the vehicle 502. By way of example and not limitation, the sensor system(s) 506 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 514. In some cases, the sensor system(s) on the drive module(s) 514 may overlap or supplement corresponding systems of the vehicle 502 (e.g., sensor system(s) 506).

The drive module(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 514 may include a drive module controller, which may receive and preprocess data from the sensor system(s) 506 and to control operation of the various vehicle systems. In some examples, the drive module controller may include one or more processors and memory communicatively coupled with the one or more processors. The memory may store one or more modules to perform various functionalities of the drive module(s) 514. Furthermore, the drive module(s) 514 also include one or more communication connection(s) that enable communication by the respective drive module with one or more other local or remote computing device(s).

In at least one example, the localization component 520, perception component 522, the planning component 524, and/or the variable resistance control system 530 may process sensor data, as described above, and may send their respective outputs, over the one or more network(s) 532, to one or more computing device(s) 534. In at least one example, the localization component 520, the perception component 522, the planning component 524, and/or the variable resistance control system 530 may send their respective outputs to the one or more computing device(s) 534 at a particular frequency, after a lapse of a predetermined period of time, in near real-time, etc.

The processor(s) 516 of the vehicle 502 and/or the processor(s) 536 of the computing device(s) 534 may include any suitable processor capable of executing instructions to process data and perform operations as described herein. By way of example and not limitation, the processor(s) 516, 536 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and 538 are examples of non-transitory computer-readable media. The memory 518 and 538 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 534, and/or components of the computing device(s) 534 may be associated with the vehicle 502. That is, the vehicle 502 may perform one or more of the functions associated with the computing device(s) 534 and vice versa.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among one or more memories.

Those skilled in the art will appreciate that the example system 500 shown in FIG. 5 is merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The system 500 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the system 500 as illustrated. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the system 500 may be transmitted to the system 500 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 102 is discussed below.

Figure 6A:
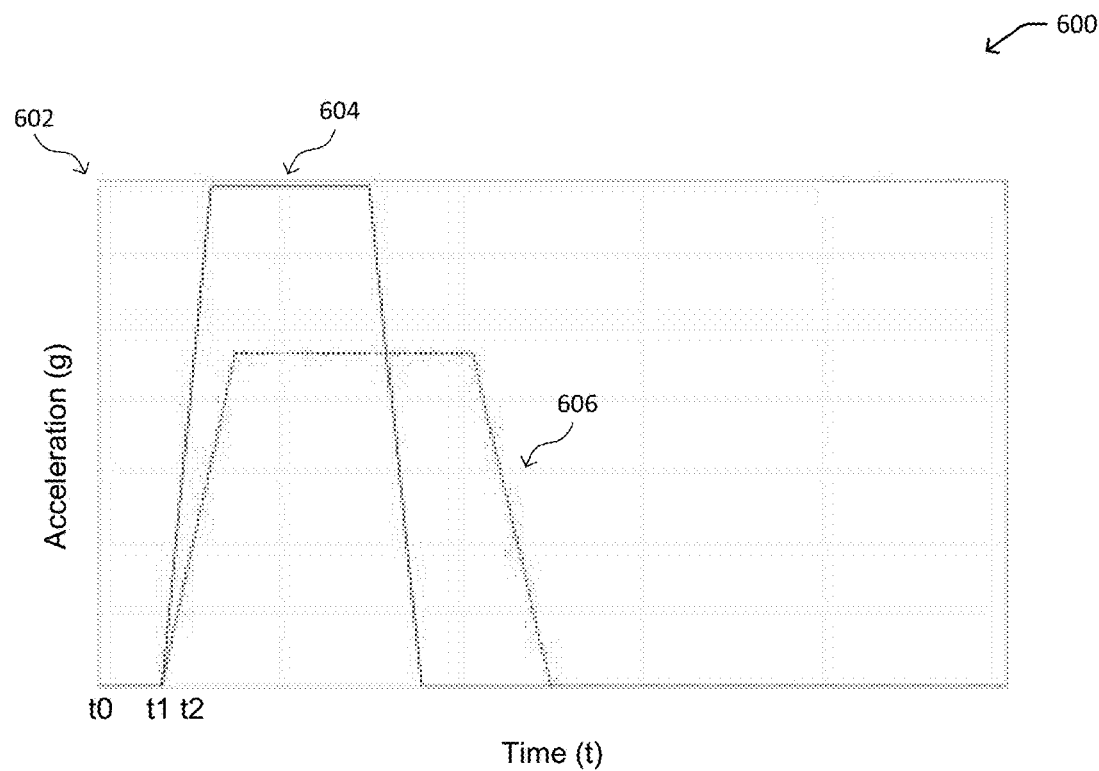
FIGS. 6A and 6B are graphs showing torso deceleration variations when implementing the example techniques described herein.
Figure 6B:
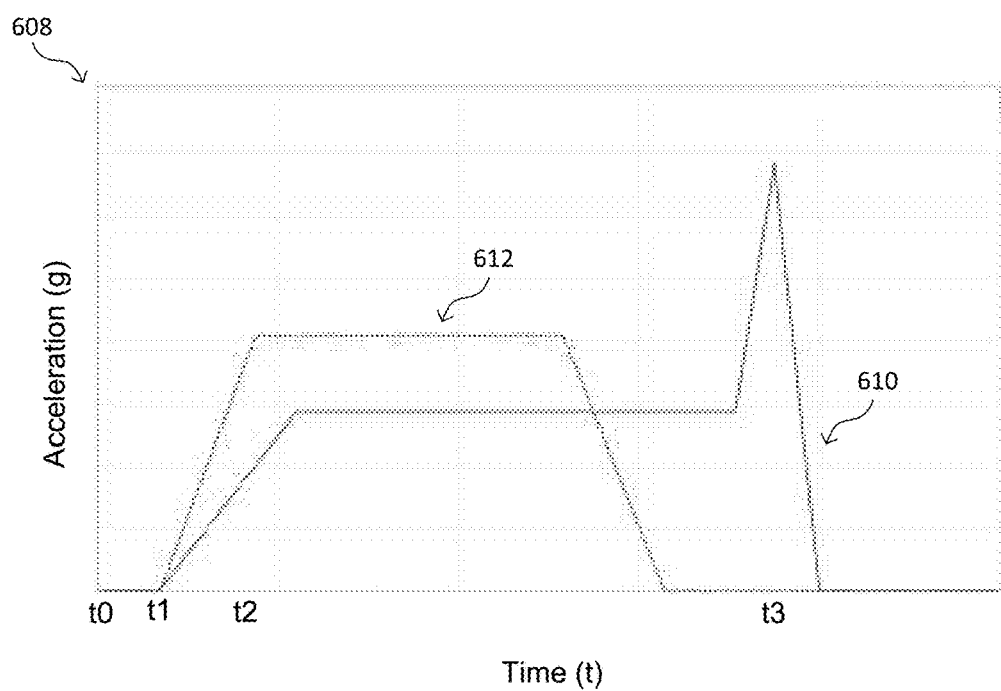

FIGS. 6A and 6B are example graphical representations of the magnitude of the force imparted to the torso of a crash test for an adult dummy due to deceleration during an event with and without implementation of the variable resistance control system 142 as described herein and between a lighter occupant and a heavier occupant. The graphs are only examples and used to illustrate the effects of the variable resistance control system 142 at least on the torso of an occupant. As stated throughout this disclosure, the system can relieve an occupant of reaction forces overall and thus can also decrease neck compression and/or other forces that could result in injury to an occupant.

Referring to FIG. 6A, a first graph 602 represents an example graph relating to the lighter occupant. In the illustrated example, the graph shows the deceleration profile of the torso of an occupant at the time of the event or collision event starting at time t0 and proceeding through the event illustrating deceleration inflexion points at different times during the event. As illustrated, in examples, absent a variable resistance control system 142 as described herein, at t0, i.e. at the beginning of the event the occupant is moving with the vehicle and thus experiences little to no deceleration. As the event occurs, the occupant body may commence pressing against the first portion 132 of seatback 124. As the comfort foam or comfort material compresses the torso may commence to experience a reaction force but only minimally thus, deceleration would also be minimal as indicated by solid line 604 at time t1. Once the comfort foam or comfort material is compressed, the energy absorbing material is engaged and at that point the graph illustrates a steep inflection point as the reaction force to the torso suddenly increases and deceleration ultimately peaks at time t2. In contrast, during the same test engaging the variable resistance control system 142, where a single inflatable bladder, located at the thoracic region of seatback 124 between two layers of comfort foam material consecutively layered inside of the first portion 132 of the seatback 124, is deployed at the time of the event, i.e. at time t0, the reaction force to the torso indicated by dashed line 606 rises at a later time than t2. Additionally, use of the variable resistance control system 142 lowers the peak reaction force and thus peak deceleration are lower. In examples, the peak magnitude of the force imparted to the torso can reduced by a change of 10% to 30% using the variable resistance control system.

Referring now to FIG. 6B, a second graph 608 represents an example graph relating to the heavier occupant. In the illustrated example, the graph shows the deceleration profile of the torso of an occupant at the time of the event or collision event starting at time t0 and proceeding through the event illustrating deceleration inflexion points at different times during the event. As illustrated, in examples, absent a variable resistance control system 142 as described herein, at t0, i.e. at the very beginning of the event the occupant is moving with the vehicle and thus experiences little to no deceleration. As the event occurs, the occupant body may commence pressing against the first portion 132 of seatback 124. As the comfort foam or comfort material compresses the torso may commence to experience a reaction force but only minimally thus, deceleration would also be minimal as indicated by solid line 610 at time t1. Once the comfort foam or comfort material is compressed, the energy absorbing material is engaged and at that point the graph illustrates a relatively steep inflection point as the reaction force to the torso suddenly increases. There may be a length of time of relatively constant force, e.g., between t2 and t3 where forces from the heavier occupant may be dissipated or otherwise absorbed. However, where the seatback 124 experiences a complete compression, the heavier occupant may not have a remainder of associated forces dissipated and/or absorbed. In such instances, deceleration may ultimately experience another steep inflection point and peak at time t3. In contrast, during the same test engaging the variable resistance control system 142, where a single inflatable bladder, located at the thoracic region of seatback 124 between two layers of comfort foam material consecutively layered inside of the first portion 132 of the seatback 124, is deployed at the time of the event, i.e. at time t0, the reaction force to the torso indicated by dashed line 612 rises at a later time than t2. Additionally, use of the variable resistance control system 142 increase the peak reaction force but may dissipate and/or absorb forces associated with the heavier occupant over a longer period of time. In examples, the peak magnitude of the force imparted to the torso can reduced by a change of 10% to 30% using the variable resistance control system.

This illustrates the safety benefits that may be derived from a seatback variable resistance control system such as the variable resistance control system 142 as described herein.

Figure 7:
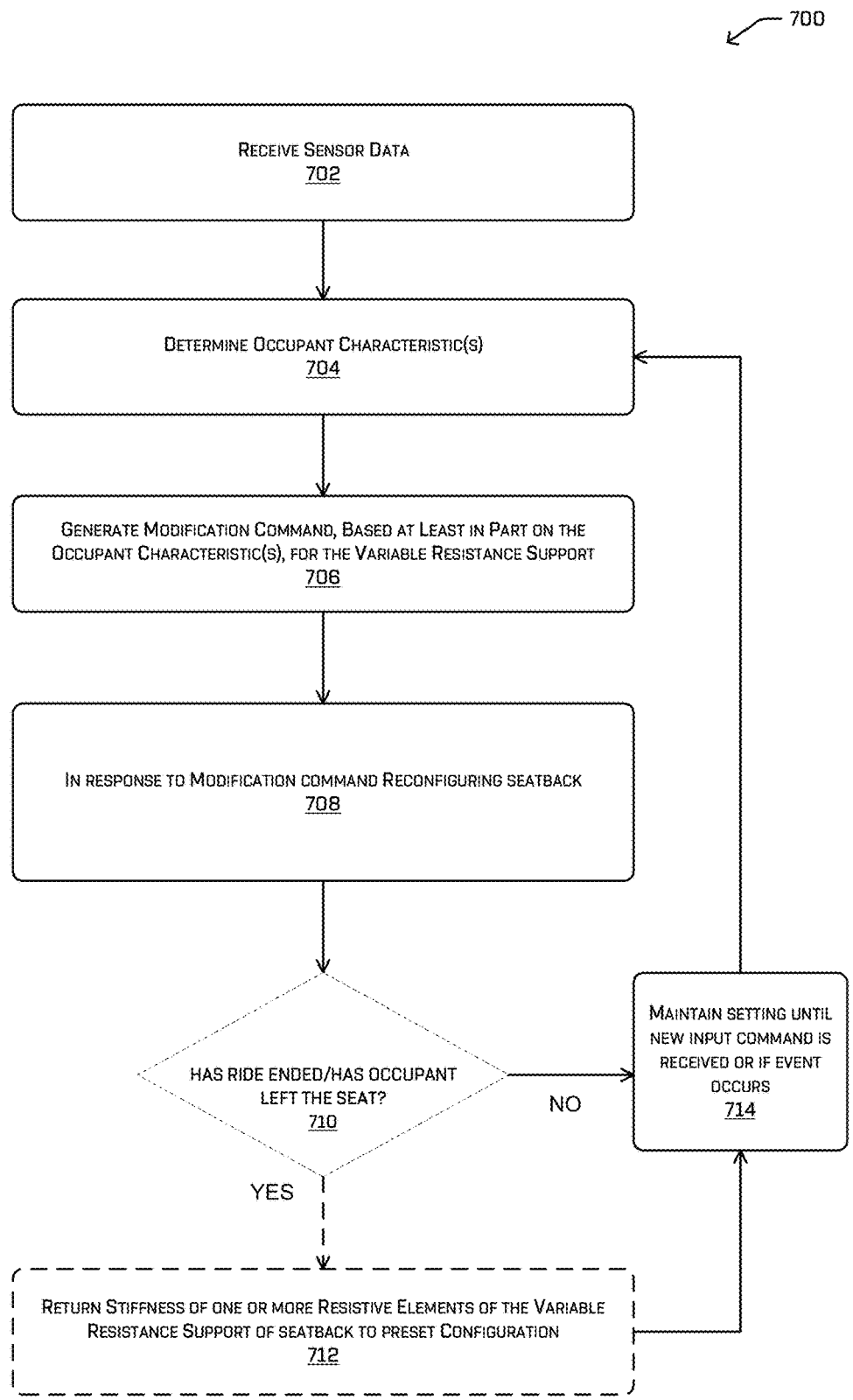
FIG. 7 is a flow diagram of an example process for protecting an occupant of a vehicle in case of an event using a variable resistance control system.

FIG. 7 is a flow diagram of an example process 700 illustrated as a collection of blocks in a logical flow graph, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 7 is a flow diagram of an example process 700 for protecting an occupant of a vehicle in case of an event using the variable resistance support 120 as described herein.

At 702, the example process 700 may include receiving at 702, first sensor data from one or more sensors that may be used at 704 to determine at least one of an occupant characteristic. Occupant characteristics may include a change in presence in a seat, a change in mass and/or weight in the seat, a perceived occupant height, a change in weight distribution in the seat, etc.

Additional data from one or more sensors can be received and analyzed to confirm activation and/or control activation as discussed earlier. The information used during this operation may include occupant information, event information, or other data that can be used as an activation parameter. In examples where activation occurs, the additional information may be used to determine activation control such as, for example, degree of activation of the resistive elements 150, stiffness level of one or more of the resistive elements 150 activated, pressurization level of one or more inflatable bladders 404, depressurization rate, selective and/or delayed activation of the inflatable bladder 404, or any other previously described control. Accordingly, or alternatively, at operation 704, the process 700 may use data stored and/or derived from a user profile.

For example, the information from operation 702 may be used at operation 704 to determine if a rearward facing occupant is present. As used herein, a rearward facing occupant can be an occupant that is seated facing a direction opposite the direction of travel and/or in the event of a collision or predicted collision, an occupant facing a direction opposite the direction in which the vehicle is colliding or predicted to collide with an object. As described earlier, this may include, for example, receiving an occupant presence signal indicative of a presence of an occupant in a seat, and determining, based at least in part on the occupant presence signal, whether an occupant is present in a seat. For example, an object classification system and/or other portions of vehicle systems may generate signals indicative of whether an occupant is present in a seat of the vehicle, and in some examples, one or more signals indicative of the seat in which the occupant is seated.

At 706, the example process 700 may include generating a modification command, based at least in part on one of a change in presence in the seat, a change in mass and/or weight in the seat, a perceived occupant height, a change in weight distribution in the seat, etc. for the variable resistance support 120.

The process 700, in some examples, may include receiving a direction signal indicative of a direction of travel of the vehicle. Based at least in part on one or more of the occupant presence signal or the direction signal, the process may be configured to determine whether the occupant is facing rearward. If at 704 it is determined that a rearward facing occupant is absent, the process may determine at 706 to generate a modification command to not deploy the variable resistance support 120. In examples, if at 704 it is determined that a rearward facing occupant is present, the process may proceed to assess additional information. For example, at operation 704, additional information may be evaluated to determine the event type, i.e. a velocity change, a collision, a predicted velocity change, a predicted collision, as well as additional information if available such as degree of velocity change, level of collision impact, direction of impact and like information. Final determination of a modification command, at 706, and/or activation control can be based on the additional information at operation 704.

At 708, the example process 700 may, in response to the modification command, reconfigure the resistive elements 150, of the variable resistance support 120, within the seatback 124. For example, individual of the resistive elements 150 may have associated stiffnesses. The process 700 may further determine an occupant characteristic, at 704, including an occupant mass. The modification command may be based at least in part on the associated stiffnesses of the individual of the resistive elements 150 and in light of the occupant mass. As such, individual of the resistive elements 150 may be reconfigured accordingly.

If it is determined that activation is necessary (e.g., reconfiguring the seatback 124), then at operation 708, the variable resistance controller 148 may cause the variable resistance support 120 to activate by engaging one or more resistive elements 150 and/or expansion devices 408 to activate one or more of the resistive elements 150 and/or pressurize or inflate one or more inflatable bladders 404 in seatback 124. In so doing, the activated resistive elements 150 and/or inflatable bladders 404 compress at least in part one or more layers or sections of comfort foam or comfort material and increase the stiffness of at least a portion of a seatback during a collision event.

Optionally, at 710, the process 700 may determine whether a ride has ended and/or whether the occupant 104 has left the seat 106.

Where the process 700 has determined that the ride has ended and/or the occupant 104 has left the seat 106 (e.g., a "Yes" at 710), the process 700 may proceed to 712.

Optionally, at 712, the process 700 may return the stiffness of one or more of the resistive elements 150 of the variable resistance support 120 of the seatback 124 to a preset configuration. For example, the preset configuration may include the resistive elements 150 being configured in a deactivated position. The deactivated position may provide little or no stiffness to the seatback 124.

Where the process 700 has determined that the ride has not ended and/or the occupant 104 has not left the seat 106 (e.g., a "No" at 710), the process 700 may proceed to 714. Additionally, the process 700 may proceed to 714 naturally flowing from 712.

At 714, the process 700 may maintain the setting (e.g., at 708, 710, or 712) until a new input command is received or it an event occurs. New input commands may be checked for continuously or periodically. New input commands may include determination of a new occupant characteristics (e.g., as determined at 704), commands from any vehicle computing device(s), etc). Events may include departure of the occupant 104, arrival of the occupant 104, ending of the ride, beginning of the ride, powering off of the vehicle 102, powering on of the vehicle, a collision event, a perceived collision event, etc. For example, the variable resistance support 120 may continuously or periodically adjust its stiffness. Where there is a perceived collision event, it may not be desirable to maintain the continuous or periodic adjustment. In such instances, the event at 714 may be a perceived collision event and the process 700 may maintain the current setting of the variable resistance support 120 until a new input command is received and/or an event occurs.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for activating a variable resistance control system have been presented herein. Moreover, although the subject matter presented herein has been described in language specific to computer structural features, methodological acts, and computer readable media, it is to be understood that the subject matter defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present disclosure, which is set forth in the following claims.

Example Clauses

A. A vehicle comprising: a seat comprising: a seat base configured to support an occupant, a sensor associated with the seat base and configured to generate sensor data associated with a mass of the occupant, and a seatback associated with the seat base and configured to provide support to a back of the occupant, the seatback comprising a first portion facing a back of the occupant, a second portion opposite the back of the occupant and spaced a distance from the first portion, a rigid element disposed between the first portion and the second portion, the rigid element and the second portion at least partially defining a volume within the seatback, and a variable resistance support disposed in the volume, the variable resistance support being configurable between a plurality of configurations to vary a resistance to forces applied by the back of the occupant to the seatback; a controller configured to perform operations comprising: receiving sensor data from the sensor, and determining, based at least in part on the sensor data, the mass of the occupant; configuring, based at least in part on the mass of the occupant exceeding a threshold value for a mass, the variable resistance support in a first configuration of the plurality of configurations; and configuring, based at least in part on the mass of the occupant being less than or equal to the threshold value of the mass, the variable resistance support in a second configuration of the plurality of configurations.

B. The vehicle as paragraph A recites, wherein the variable resistance support comprises: an array of resistive elements, individual of the resistive elements being configured for selective positioning in an active state or an inactive state, wherein: in the active state the resistive elements are configured to resist forces applied by the rigid element; and in the inactive state, the resistive elements are spaced from the rigid element.

C. The vehicle as paragraph A or B recites, wherein the first configuration comprises a first subset of the resistive elements in the active state and a second subset of the resistive elements in the inactive state; and the second configuration comprises the first subset of the resistive elements in the active state and the second subset of the resistive elements in the active state.

D. The vehicle as any one of paragraphs A-C recites, wherein the volume is a fixed volume, and wherein the resistive elements are configured to resist a force applied to the first portion of the seatback by the occupant during a collision event to substantially maintain the fixed volume, the force corresponding to the mass of the occupant.

E. The vehicle as any one of paragraphs A-D recites, wherein the variable resistance support comprises: a plurality of inflatable bladders configured to be selectively inflated or deflated between an inflated state and a deflated state.

F. The vehicle as any one of paragraphs A-E recites, wherein the first configuration comprises a first subset of the plurality of inflatable bladders in the inflated state and a second subset of the plurality of inflatable bladders in the deflated state; and the second configuration comprises the first subset of the plurality of inflatable bladders in the inflated state and the second subset of the plurality of inflatable bladders in the inflated state.

G. A seat for a vehicle, the seat comprising: a seatback including a first portion and a second portion, wherein the first portion and the second portion define at least a portion of a volume; and a variable resistance support disposed within the volume, the variable resistance support being configurable between at least a first configuration resulting in a first stiffness to the seatback and a second configuration resulting in a second stiffness to the seatback, wherein the variable resistance support is configured in the first configuration or the second configuration based at least in part on one or more physical characteristics of an occupant of the seat, and wherein the variable resistance support maintains the volume as a substantially fixed volume in the first configuration or in the second configuration by resisting forces resulting from an occupant during a collision event of the vehicle.

H. The seat as paragraph G recites, further comprising a rigid element disposed between the first portion and the variable resistance support.

I. The seat as paragraph G or H recites, wherein the second portion is spaced a distance from the first portion, and wherein the first portion and the second portion are fixed relative to each other.

J. The seat as any one of paragraphs G-I recites, wherein the variable resistance support comprises: one or more resistive elements, and one or more linkages coupled to the one or more resistive elements; wherein the one or more linkages are configured to cause the one or more resistive elements to actuate from an inactive state to an active state.

K. The seat as any one of paragraphs G-J recites, wherein the one or more resistive elements are configured to at least partially rotate between the inactive state and the active state.

L. The seat as any one of paragraphs G-K recites, further comprising: a sensor disposed in the seat, and wherein individual of the one or more resistive elements are configured to actuate from the inactive state to the active state, based at least in part on sensor data generated by the sensor and indicative of a mass of an occupant in the seat.

M. The seat as any one of paragraphs G-L recites, wherein the one or more resistive elements are arranged in an array, and wherein the array includes one or more resistive elements extending along a first direction, vertically along the seat, and wherein the array further includes one or more resistive elements extending along a second direction, horizontally along the seat.

N. The seat as any one of paragraphs G-M recites, wherein the variable resistance support comprises: a sensor; a bladder structure comprising one or more inflatable bladders; and an expansion device in flow communication with the one or more inflatable bladders and configured to cause the one or more inflatable bladders to inflate from a first state to a second state based at least in part on sensor data indicative of a mass of an occupant in the seat.

O. The seat as any one of paragraphs G-N recites, wherein a pressure of the one or more inflatable bladders in the second state is based at least in part on a mass of the occupant in the seat.

P. The seat as any one of paragraphs G-O recites, wherein the variable resistance support maintains the volume as the substantially fixed volume in the first configuration and the second configuration.

Q. A method for protecting an occupant of a vehicle, the method comprising: receiving sensor data from a sensor associated with a vehicle seat, determining, based at least in part on the sensor data, a physical characteristic of the occupant; configuring, based at least in part on a mass of the occupant exceeding a threshold value for a mass, a variable resistance support in a first configuration of a plurality of configurations; or configuring, based at least in part on the mass of the occupant being less than or equal to the threshold value of the mass, the variable resistance support in a second configuration of the plurality of configurations.

R. The method as paragraph Q recites, further comprising: adjusting a stiffness of the variable resistance support including rotating one or more resistive elements within an array between an inactive state and an active state within a fixed volume of a seatback.

S. The method as paragraph Q or R recites, wherein adjusting the stiffness of the variable resistance support includes increasing a stiffness by actuating one or more resistive elements within the array to the active state in response to a first occupant mass, and wherein adjusting the stiffness of the variable resistance support includes decreasing the stiffness by actuating one or more resistive elements within the array to the inactive state in response to a second occupant mass, the second occupant mass being less than the first occupant mass.

T. The method as any one of paragraphs Q-S recites, further comprising: adjusting a stiffness of the variable resistance support including at least partially inflating one or more inflatable bladders.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

What is claimed is:

1. A vehicle comprising:
   a seat comprising:
      a seat base configured to support an occupant,
      a sensor associated with the seat base and configured to generate sensor data associated with a mass of the occupant, and
      a seatback associated with the seat base and configured to provide support to a back of the occupant, the seatback comprising a first portion facing a back of the occupant, a second portion opposite the back of the occupant and spaced a distance from the first portion, a rigid element disposed between the first portion and the second portion, the rigid element and the second portion at least partially defining a volume within the seatback, and a variable resistance support disposed in the volume, the variable resistance support being configurable between a plurality of configurations to vary a resistance to forces applied by the back of the occupant to the seatback;
   a controller configured to perform operations comprising:
      receiving sensor data from the sensor, and
      determining, based at least in part on the sensor data, the mass of the occupant;
      configuring, based at least in part on the mass of the occupant exceeding a threshold value for a mass, the variable resistance support in a first configuration of the plurality of configurations; and
      configuring, based at least in part on the mass of the occupant being less than or equal to the threshold value of the mass, the variable resistance support in a second configuration of the plurality of configurations.

2. The vehicle of claim 1, wherein the variable resistance support comprises:
   an array of resistive elements, individual of the resistive elements being configured for selective positioning in an active state or an inactive state, wherein:
      in the active state the resistive elements are configured to resist forces applied by the rigid element; and
      in the inactive state, the resistive elements are spaced from the rigid element.

3. The vehicle of claim 2, wherein the first configuration comprises a first subset of the resistive elements in the active state and a second subset of the resistive elements in the inactive state; and the second configuration comprises the first subset of the resistive elements in the active state and the second subset of the resistive elements in the active state.

4. The vehicle of claim 3, wherein the volume is a fixed volume, and wherein the resistive elements are configured to resist a force applied to the first portion of the seatback by the occupant during a collision event to substantially maintain the fixed volume, the force corresponding to the mass of the occupant.

5. The vehicle of claim 1, wherein the variable resistance support comprises:
   a plurality of inflatable bladders configured to be selectively inflated or deflated between an inflated state and a deflated state.

6. The vehicle of claim 5, wherein the first configuration comprises a first subset of the plurality of inflatable bladders in the inflated state and a second subset of the plurality of inflatable bladders in the deflated state; and the second configuration comprises the first subset of the plurality of inflatable bladders in the inflated state and the second subset of the plurality of inflatable bladders in the inflated state.

7. A seat for a vehicle, the seat comprising:
a seatback including a first portion and a second portion, wherein the first portion and the second portion define at least a portion of a volume; and
a variable resistance support disposed within the volume, the variable resistance support being configurable between at least a first configuration resulting in a first stiffness to the seatback and a second configuration resulting in a second stiffness to the seatback, wherein the variable resistance support is configured in the first configuration or the second configuration based at least in part on one or more physical characteristics of an occupant of the seat, and wherein the variable resistance support maintains the volume as a substantially fixed volume in the first configuration or in the second configuration by resisting forces resulting from an occupant during a collision event of the vehicle.

8. The seat of claim 7, further comprising a rigid element disposed between the first portion and the variable resistance support.

9. The seat of claim 7, wherein the second portion is spaced a distance from the first portion, and wherein the first portion and the second portion are fixed relative to each other.

10. The seat of claim 7, wherein the variable resistance support comprises:
one or more resistive elements, and
one or more linkages coupled to the one or more resistive elements;
wherein the one or more linkages are configured to cause the one or more resistive elements to actuate from an inactive state to an active state.

11. The seat of claim 10, wherein the one or more resistive elements are configured to at least partially rotate between the inactive state and the active state.

12. The seat of claim 10, further comprising:
a sensor disposed in the seat, and wherein individual of the one or more resistive elements are configured to actuate from the inactive state to the active state, based at least in part on sensor data generated by the sensor and indicative of a mass of an occupant in the seat.

13. The seat of claim 10, wherein the one or more resistive elements are arranged in an array, and wherein the array includes one or more resistive elements extending along a first direction, vertically along the seat, and wherein the array further includes one or more resistive elements extending along a second direction, horizontally along the seat.

14. The seat of claim 7, wherein the variable resistance support comprises:
a sensor;
a bladder structure comprising one or more inflatable bladders; and
an expansion device in flow communication with the one or more inflatable bladders and configured to cause the one or more inflatable bladders to inflate from a first state to a second state based at least in part on sensor data indicative of a mass of an occupant in the seat.

15. The seat of claim 14, wherein a pressure of the one or more inflatable bladders in the second state is based at least in part on a mass of the occupant in the seat.

16. The seat of claim 7, wherein the variable resistance support maintains the volume as the substantially fixed volume in the first configuration and the second configuration.

17. A method for protecting an occupant of a vehicle, the method comprising:
receiving sensor data from a sensor associated with a vehicle seat,
determining, based at least in part on the sensor data, a physical characteristic of the occupant;
configuring, based at least in part on a mass of the occupant exceeding a threshold value for a mass, a variable resistance support in a first configuration of a plurality of configurations; or
configuring, based at least in part on the mass of the occupant being less than or equal to the threshold value of the mass, the variable resistance support in a second configuration of the plurality of configurations.

18. The method of claim 17, further comprising:
adjusting a stiffness of the variable resistance support including rotating one or more resistive elements within an array between an inactive state and an active state within a fixed volume of a seatback.

19. The method of claim 18, wherein adjusting the stiffness of the variable resistance support includes increasing a stiffness by actuating one or more resistive elements within the array to the active state in response to a first occupant mass, and wherein adjusting the stiffness of the variable resistance support includes decreasing the stiffness by actuating one or more resistive elements within the array to the inactive state in response to a second occupant mass, the second occupant mass being less than the first occupant mass.

20. The method of claim 17, further comprising:
adjusting a stiffness of the variable resistance support including at least partially inflating one or more inflatable bladders.

* * * * *